Sept. 5, 1933.         G. G. POLAKOFF         1,925,402
                       AUTOMATIC PHONOGRAPH
                   Filed Oct. 19, 1929     13 Sheets-Sheet 1

Sept. 5, 1933.   G. G. POLAKOFF   1,925,402
AUTOMATIC PHONOGRAPH
Filed Oct. 19, 1929   13 Sheets-Sheet 2
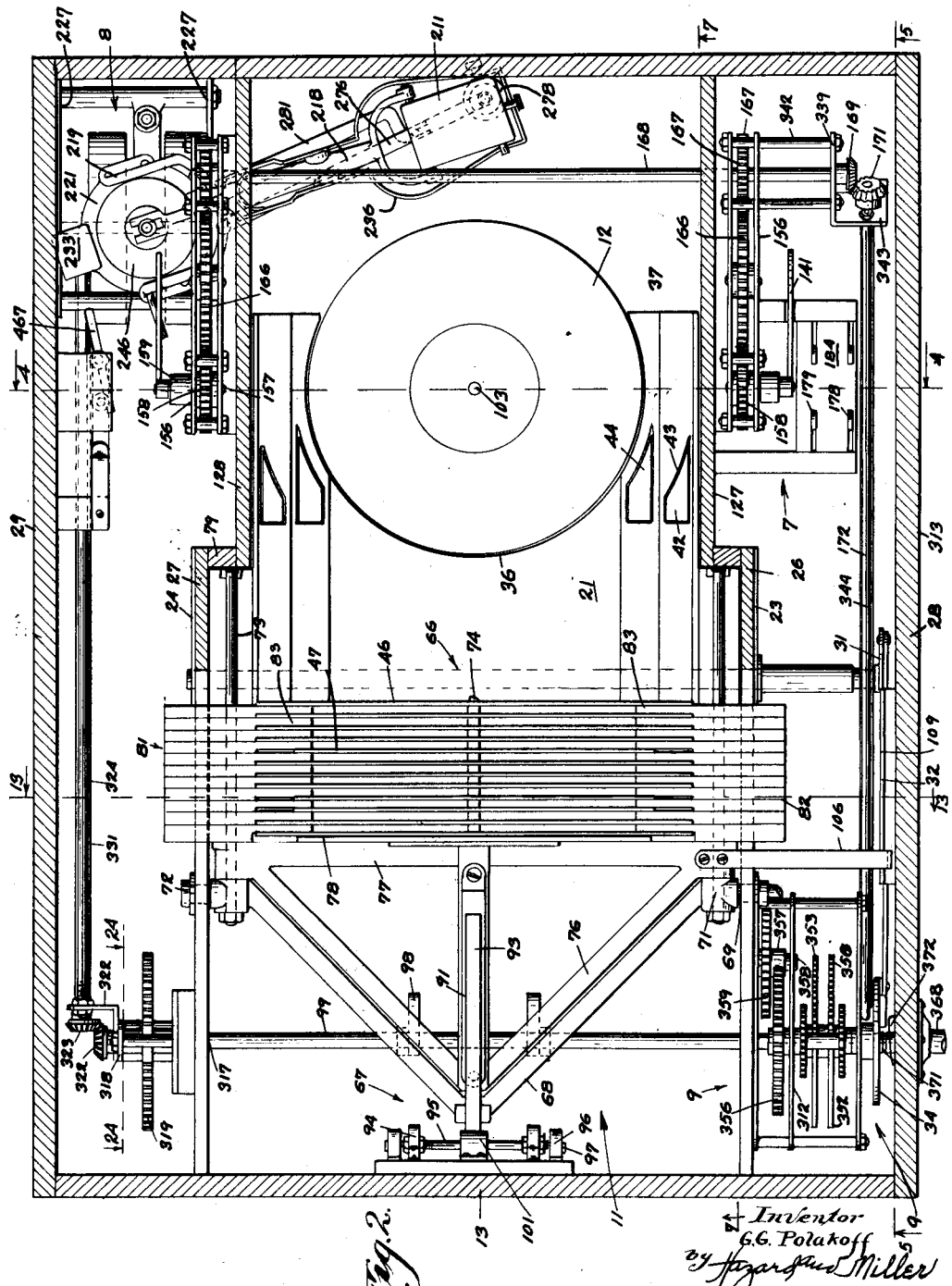

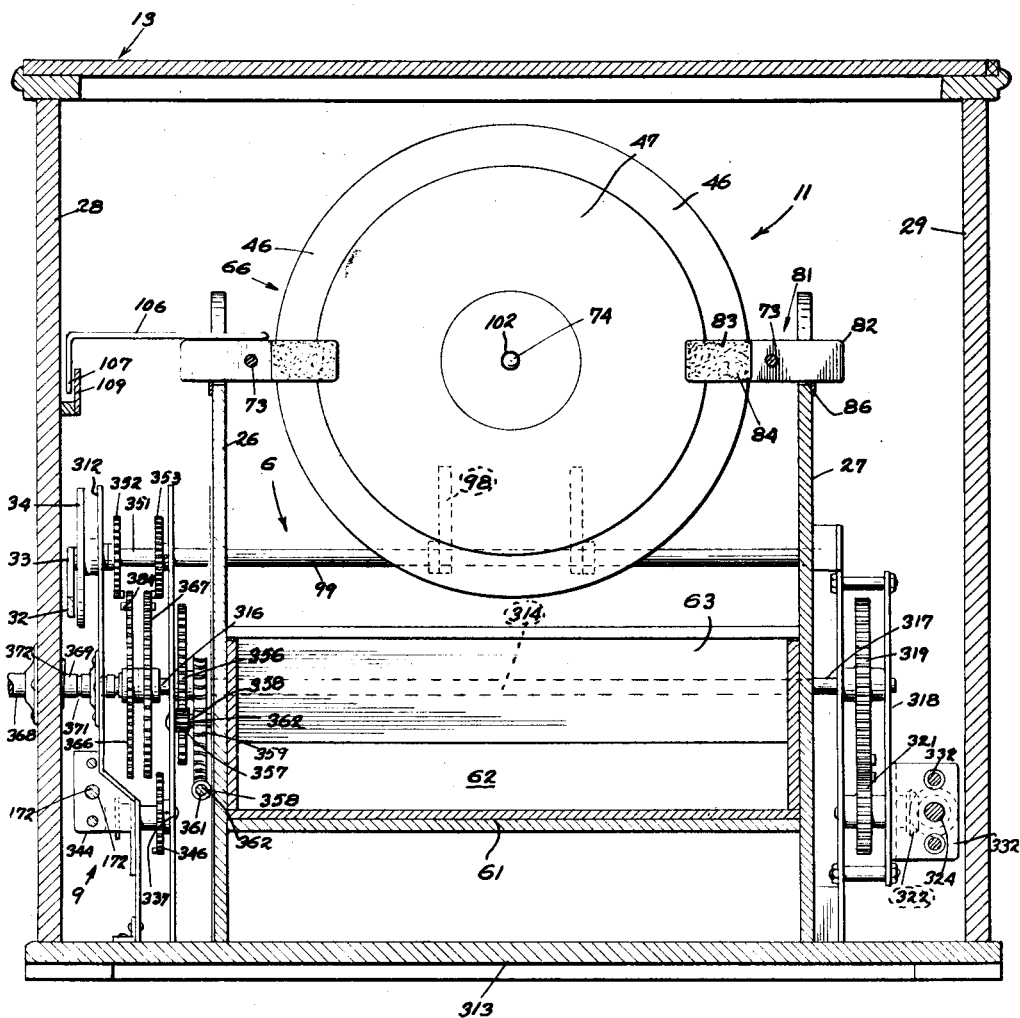

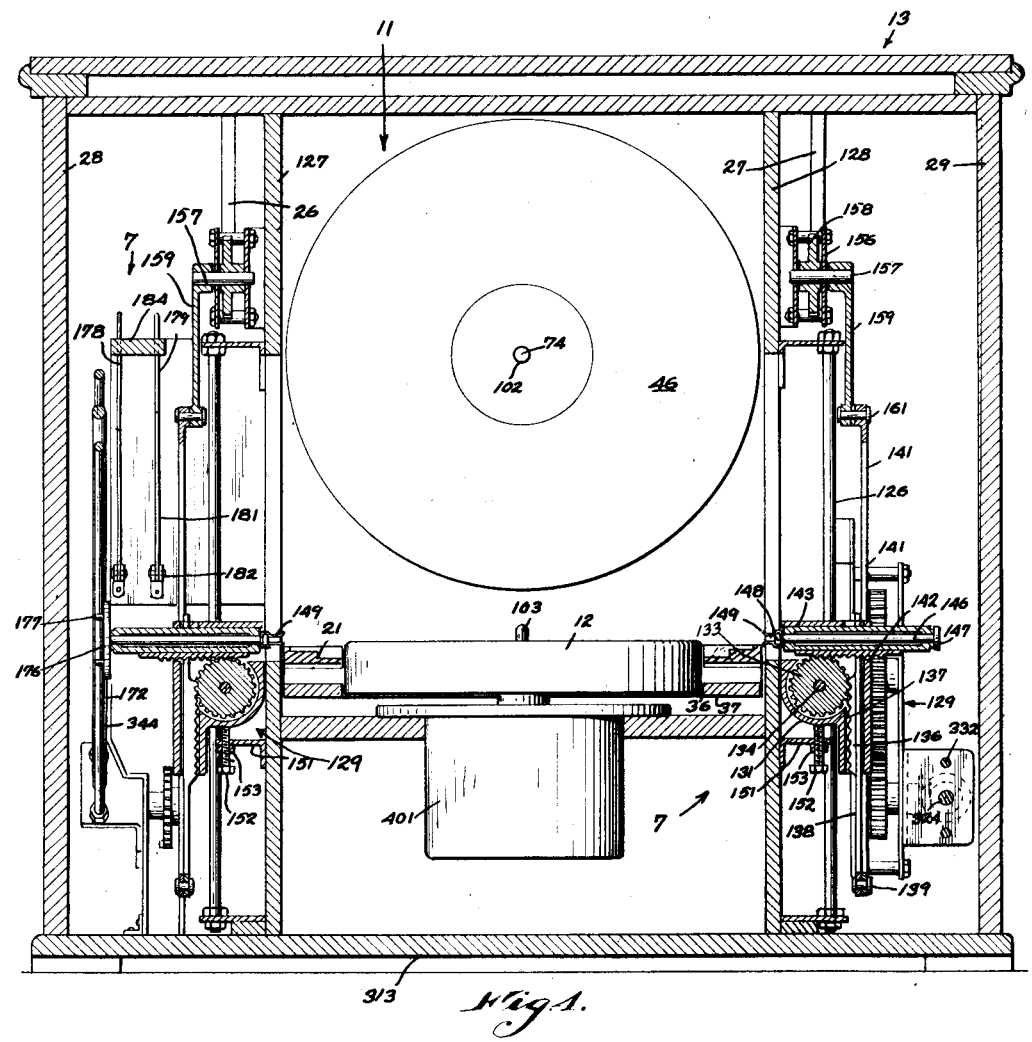

Sept. 5, 1933.　　　G. G. POLAKOFF　　　1,925,402
AUTOMATIC PHONOGRAPH
Filed Oct. 19, 1929　　　13 Sheets-Sheet 5
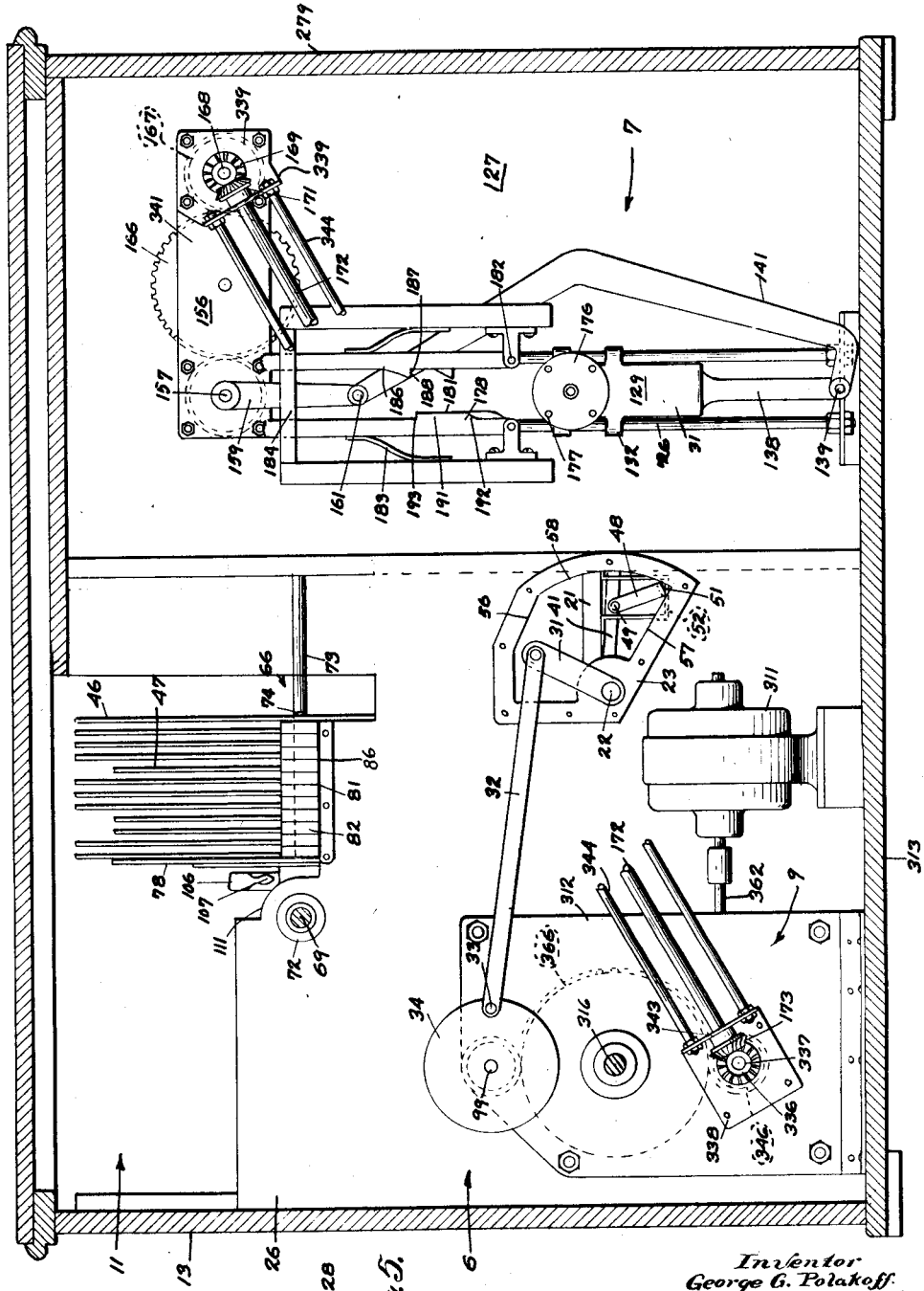
Inventor
George G. Polakoff
by Hazard and Miller
Attorneys Sept. 5, 1933.  G. G. POLAKOFF  1,925,402
AUTOMATIC PHONOGRAPH
Filed Oct. 19, 1929  13 Sheets-Sheet 6
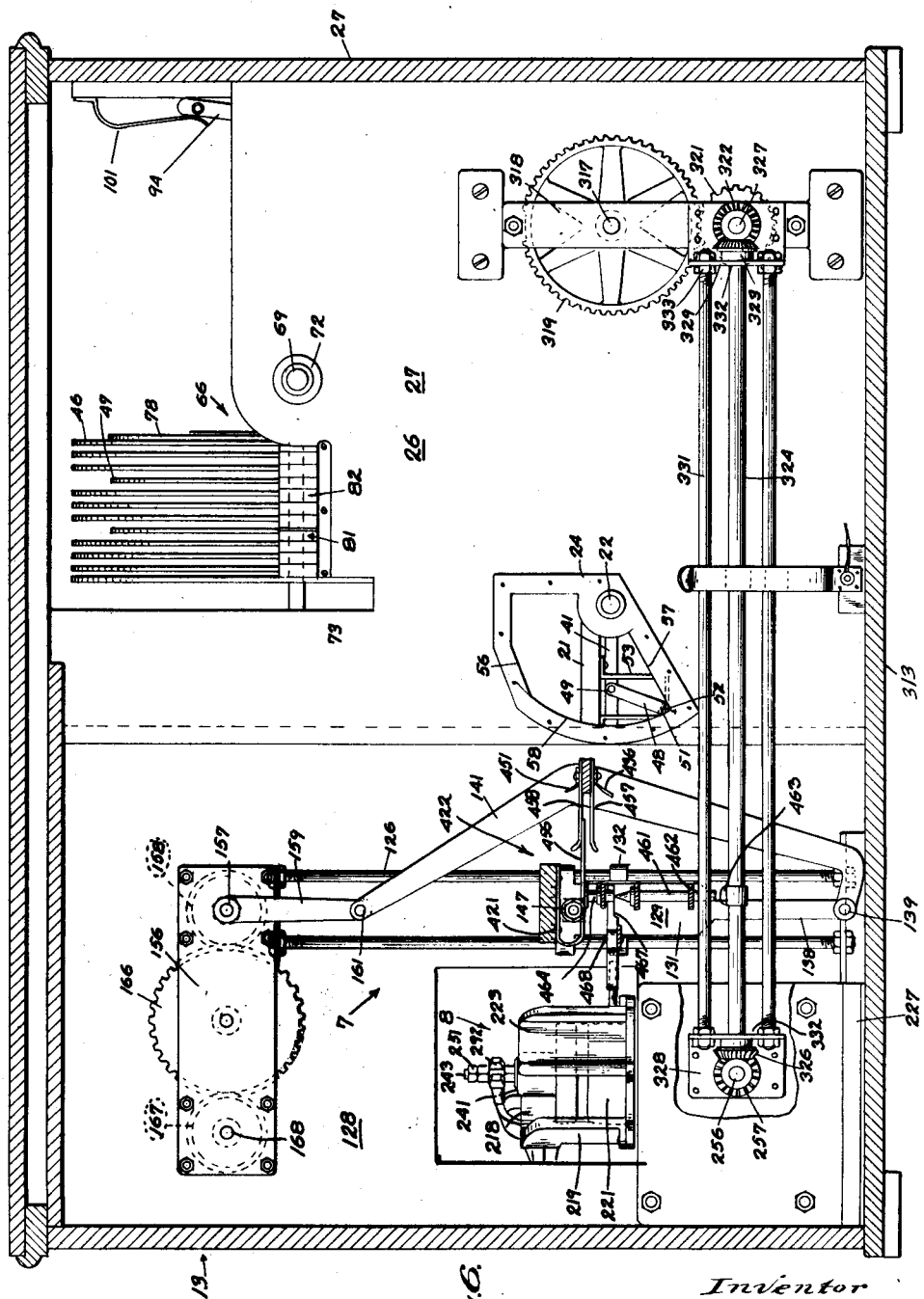
Inventor
George G. Polakoff
by Hazard and Miller
Attorneys

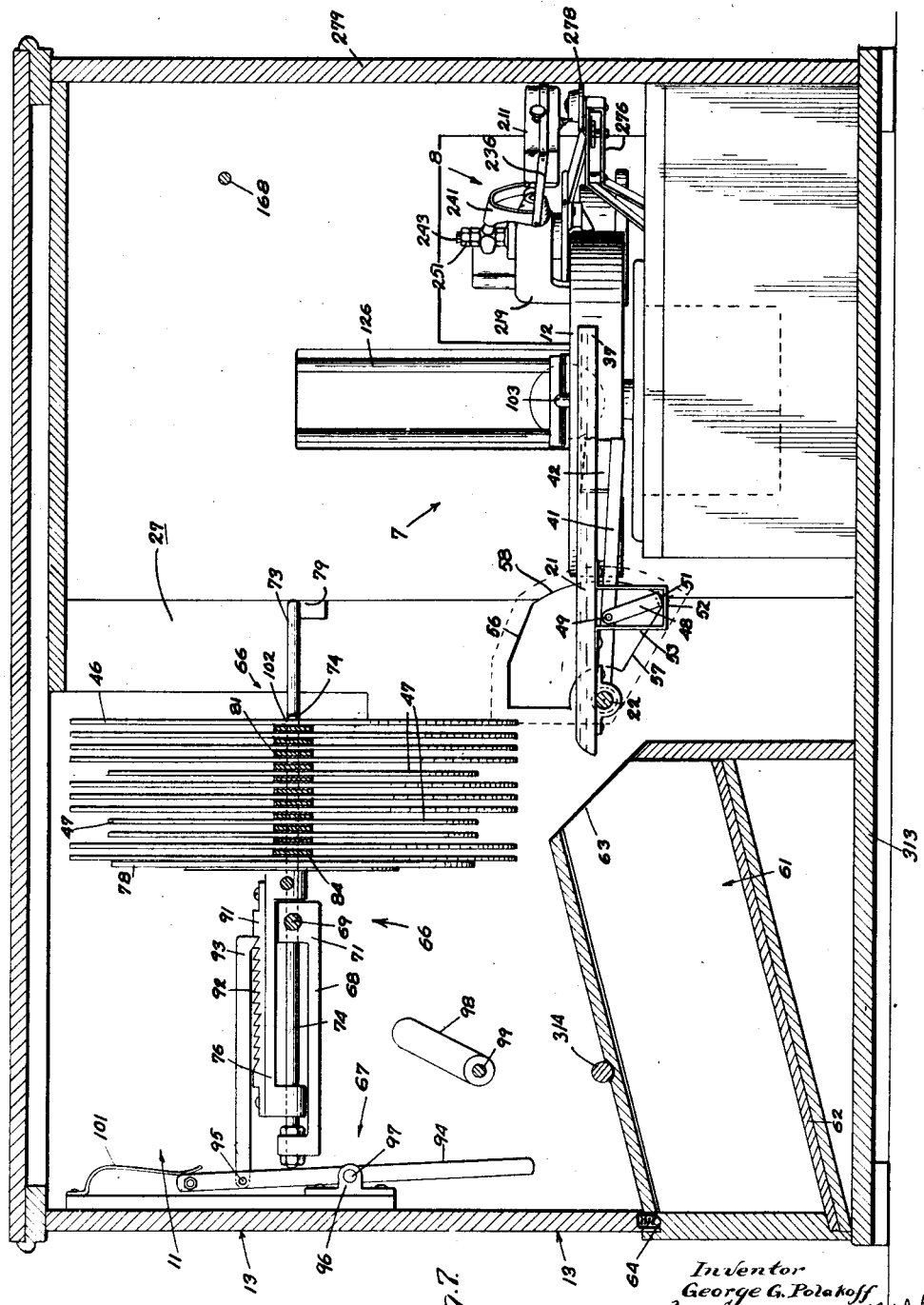

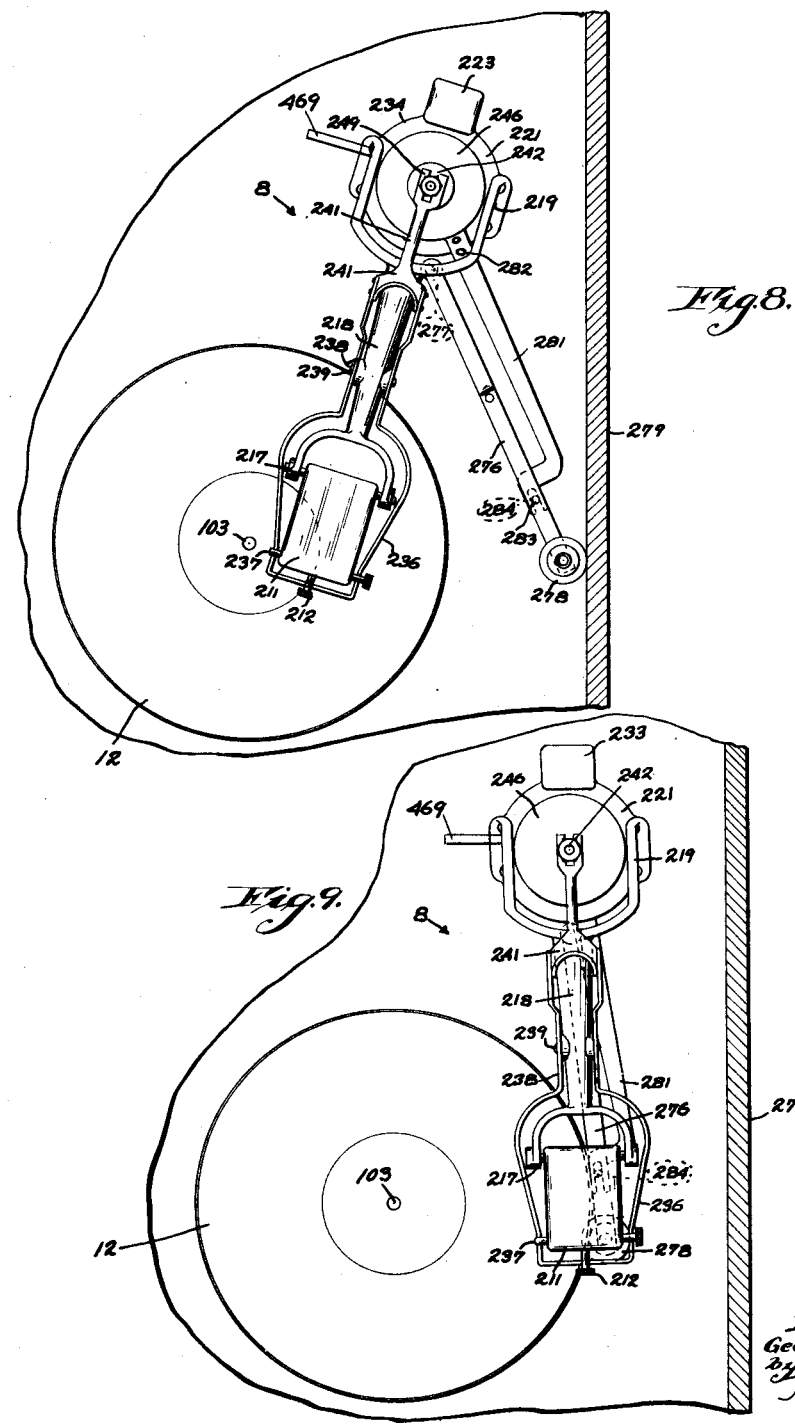

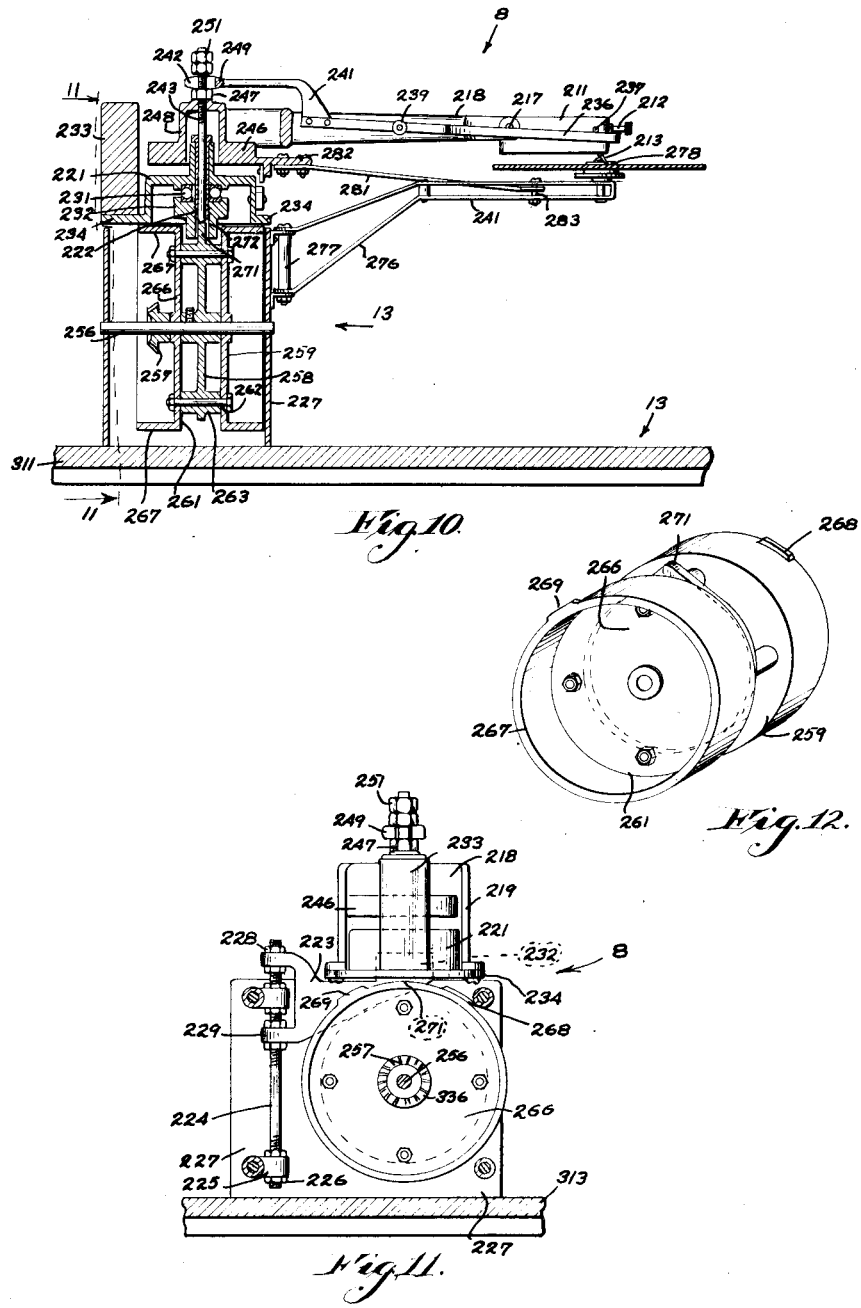

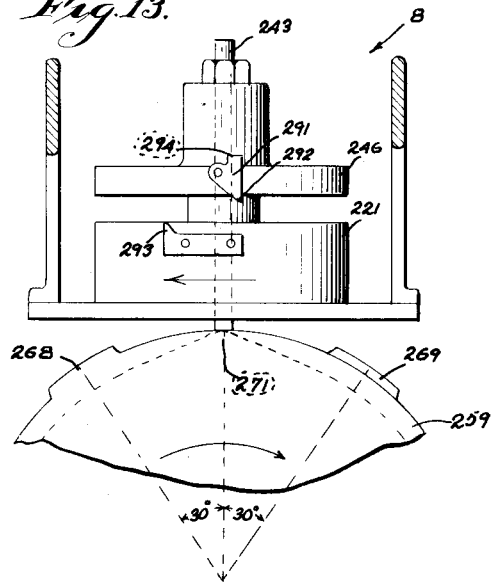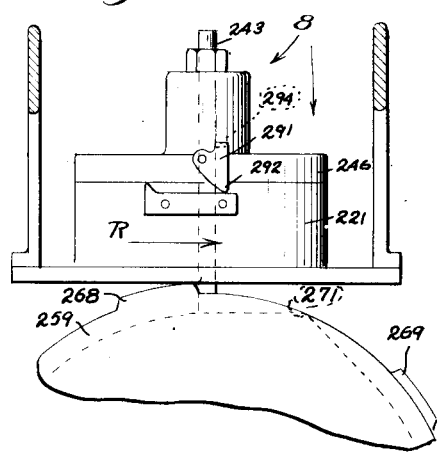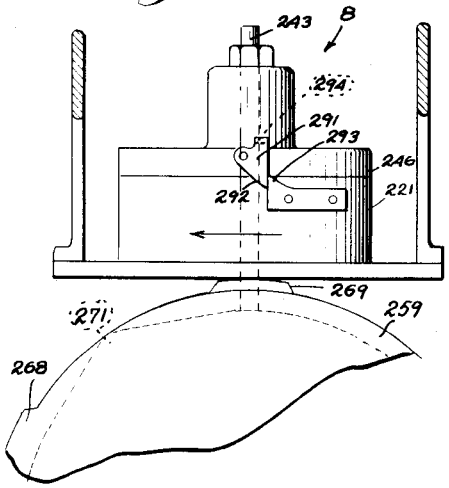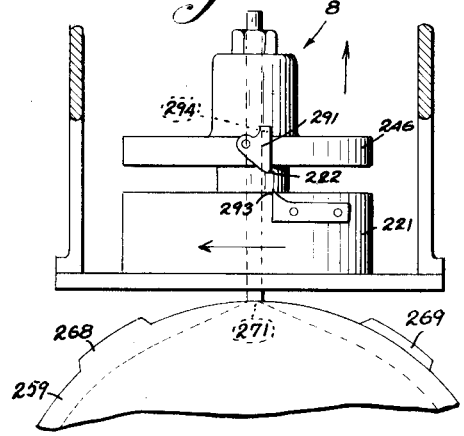

Sept. 5, 1933.  G. G. POLAKOFF  1,925,402
AUTOMATIC PHONOGRAPH
Filed Oct. 19, 1929   13 Sheets-Sheet 11
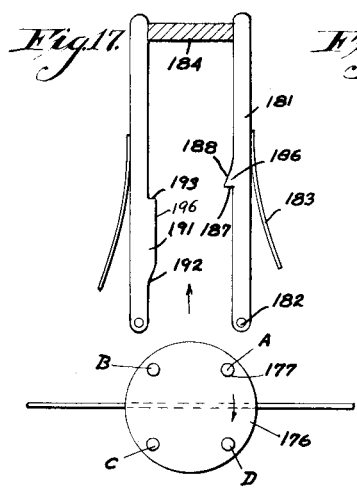
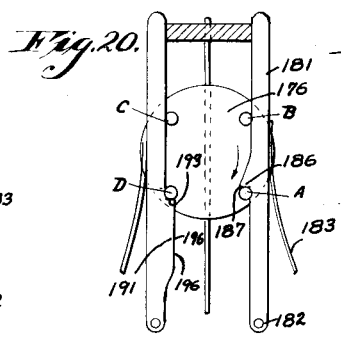
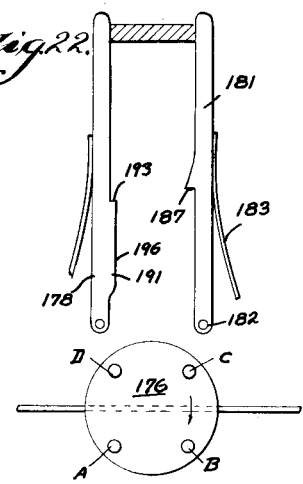
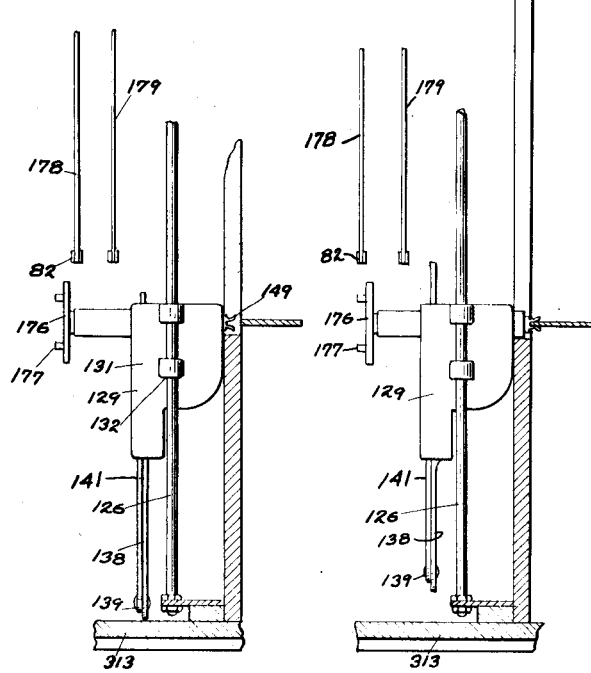
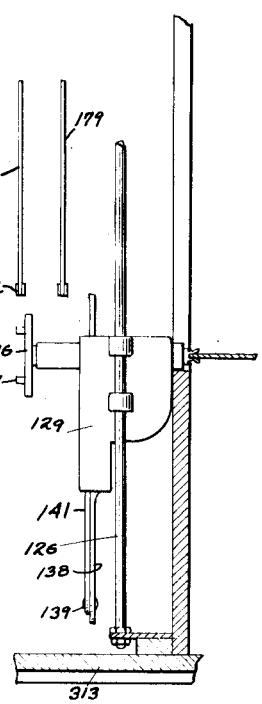
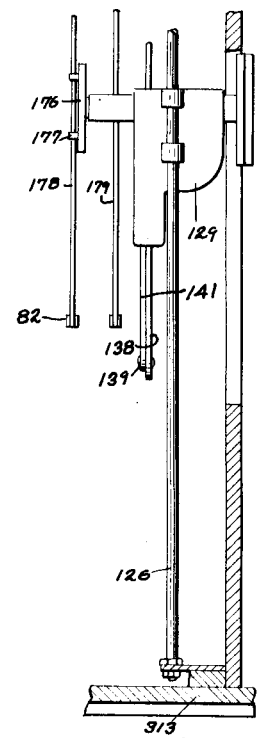
Inventor
George G. Polakoff
by Hazard and Miller
Attorneys

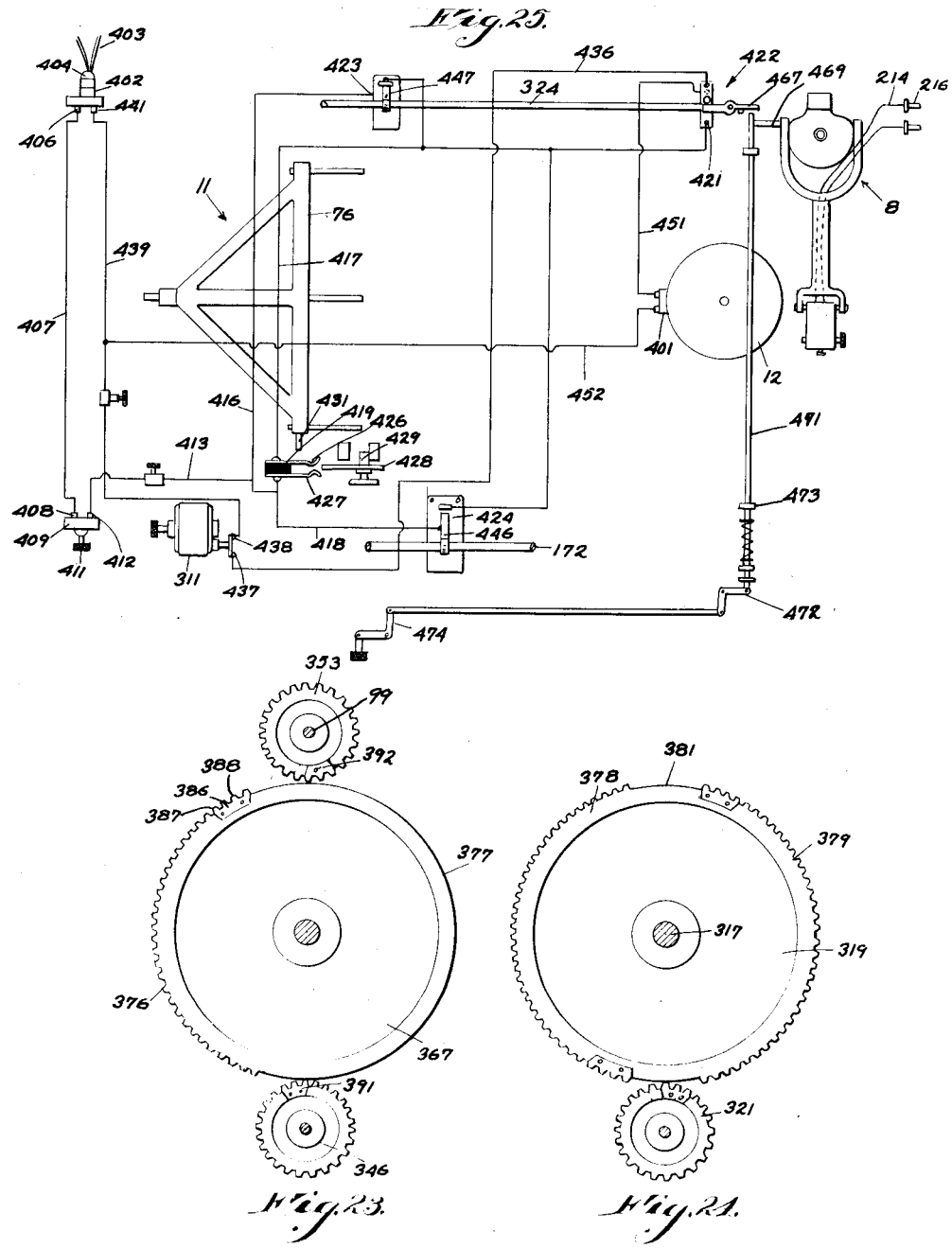

Sept. 5, 1933.  G. G. POLAKOFF  1,925,402
AUTOMATIC PHONOGRAPH
Filed Oct. 19, 1929  13 Sheets-Sheet 13
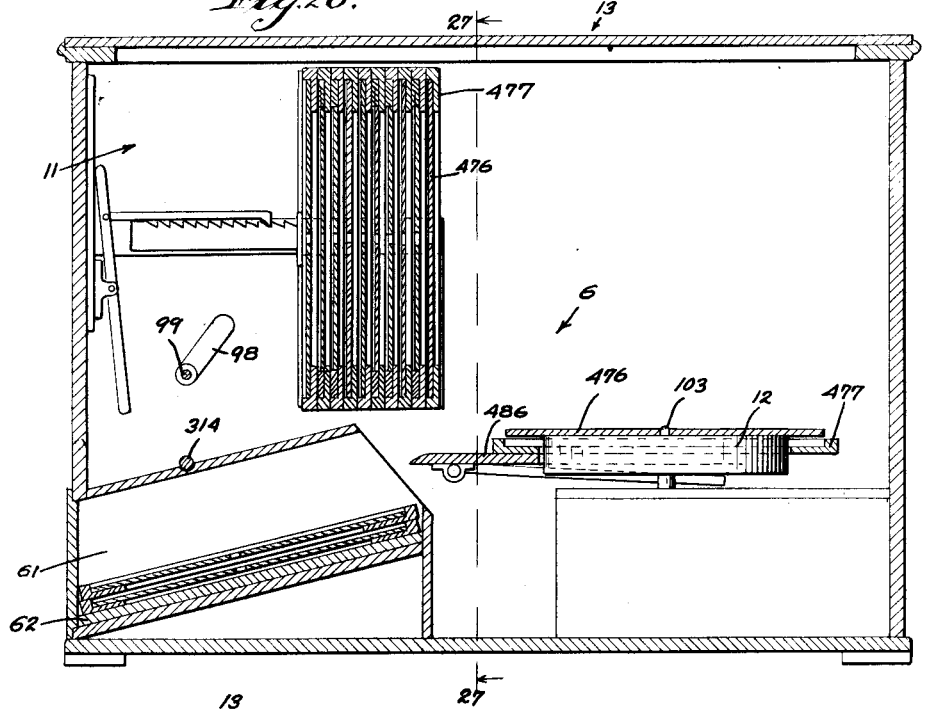
Fig. 26.
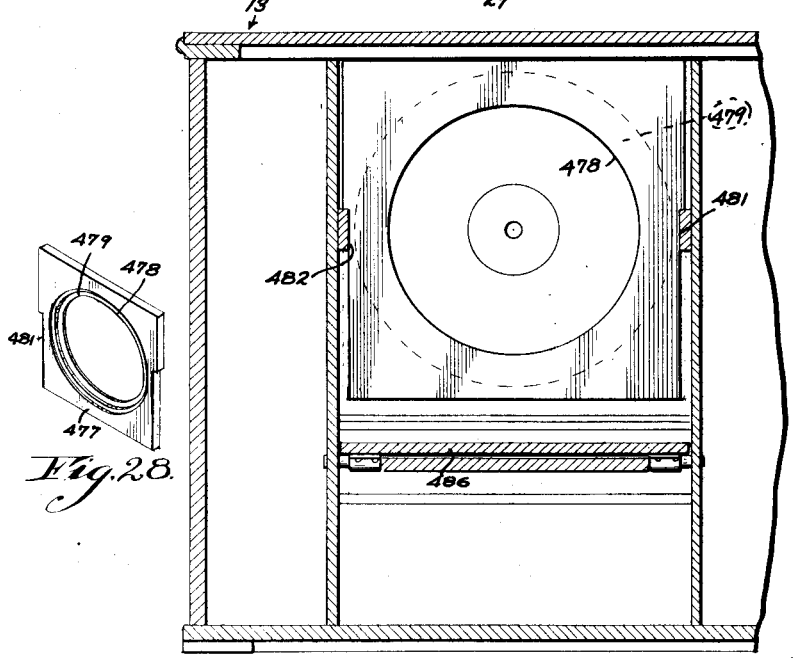
Fig. 28.
Fig. 27.
Inventor
George G. Polakoff.
by Hazard and Miller
Attorneys Patented Sept. 5, 1933

1,925,402

UNITED STATES PATENT OFFICE 1,925,402

AUTOMATIC PHONOGRAPH

George G. Polakoff, Los Angeles, Calif., assignor of one-fourth to Harry E. Kirkpatrick, Los Angeles, Calif.

Application October 19, 1929. Serial No. 400,797

47 Claims. (Cl. 274—10)

This invention relates to sound reproduction, and more especially to a phonograph capable of reproducing sound recorded upon disc records.

An object of the present invention is the construction of a phonograph provided with mechanism for automatically removing a record after the playing thereof has been completed, from the turntable, and substituting another record therefor, and also provided with mechanism properly synchronized therewith and capable of operating the tone-arm and sound-box for the pick-up device where the invention is embodied in an electrical phonograph.

A more detailed object in connection with the record-changing mechanism, is to so construct the machine that a plurality of disc records may be loaded into the record magazine; and after the machine has been started, the records will be automatically and successively placed upon the turntable, the pick-up device or its equivalent placed thereupon in playing position, the turntable rotated, and after the playing of each record has been completed, the pick-up device withdrawn and the played record placed within a record compartment to make way for the next record from the magazine.

Another object is the provision of means for automatically inverting the records so that both sides of double-faced records may be played.

A more detailed object in this connection, is the provision of mechanism for removing a record from the turntable upon the withdrawal of the pick-up device after playing one side of the record, and then re-depositing the record in playing position but inverted, with the result that both sides of each record may be played between operations of the record-changing mechanism. The importance of playing records in such sequence, lies in the fact that series of records are now available upon the market, in which relatively lengthy addresses and musical selections are recorded, such for example, as the complete score of an opera. In fact, series of fifteen, and even more double-faced records, requiring more than two hours for playing, are not at all uncommon. However, the universal practice in the production of such series of records, is to so arrange the individual selections that first one side and then the other of each record is to be played before discarding that record in order to reproduce the entire address or musical selection in the proper sequence.

A still further object is the provision of proper controls and the mechanism associated therewith, necessary to permit an operator to optionally throw the record-changing mechanism and the record-inverting mechanism, or the record-inverting mechanism only, out of operation, so that the machine is capable of repeating indefinitely, the playing of one side of a single record, and is also capable of playing but one side of each record and then discarding that record and playing the next one from the magazine upon the turntable.

An additional object in respect to the flexibility of the machine as far as the sequence in which the records are played is concerned, is to so construct the controls and their associated mechanism that an operator may effect a change during operation of the machine, with the result that a portion of the program may be played according to one sequence, say for example, some of the records may be played upon both sides of each, and then the operator may, without stopping the machine, effect such a change therein that the following records will be played upon only one side. Obviously, this arrangement will permit the elimination of the playing of one side of a single record, or of more records, from the entire series.

Another object is the provision of means for immediately discarding or inverting a record from the turntable, and substituting therefor another from the record magazine, regardless of whether the playing of the record to be discarded, has commenced or not.

A further object is the provision of indicating means visible from the exterior of the cabinet, whereby an operator is readily advised which record of the several originally placed within the magazine, is being played at any given time. This feature is important, in that it facilitates the elimination of the playing of one or both sides of one or more records, by keeping the operator informed as to which record is being played at any given time, with the result that he knows at what time to effect the change in the controls to produce the desired variation in the previously arranged program.

Another object is the provision of an automatic phonograph capable of carrying out the above listed objects, which is also capable of accommodating records of various sizes in respect to both diameter and thickness. In this connection, it should be explained that the machine is so designed that records of various sizes may be loaded into the magazine, in order to effect their being played in any predetermined sequence, regardless of the size of the records within the capacity of the machine. In other words, the sequence is not dependent upon the thickness or diameter of the records, and does not require that all the records of one size be played before those of another size are permitted to pass through the machine.

A still further object is the provision of an automatic phonograph capable of carrying out the many objects listed hereinabove, efficiently, quietly, without liability of damage to the records, and within an absolute minimum of elapsed time, so as to cause the smallest possible interruption of the continuous playing of all the records constituting the entire program.

Another object is the provision of an automatic phonograph in which several distinct mechanisms are employed for carrying out the several functions necessary for changing records, for inverting a record after one side thereof, has been played, and for operating the pick-up device in proper synchronization with the record-changing mechanism and the record-inverting mechanism, and in which these various separate mechanisms are all operated from a single driving motor.

A still further object is the provision of a novel type of driving mechanism for the record-changing mechanism, record-inverting mechanism, and pick-up device operating mechanism, in which each of the various mechanisms is connected to its driving motor by suitable gearing, so as to insure positive drive and synchronization.

An additional object is the provision of a geared drive for each of the various mechanisms as described, in which the meshing engagement of certain of the gears is broken when the associated part is to be held stationary, and in which means are provided for insuring proper engagement of the teeth of the driven gear with those of the driving gear in each of these gear drives when meshing engagement is resumed, and thus prevent the liability of the teeth of one gear riding upon the top of those of the other, with the resultant damage to the mechanism which would result from such improper engagement.

The invention possesses other objects and advantageous features, some of which, with those enumerated, will be set forth in the following description of the invention's particular embodiment which is illustrated in the drawings accompanying and forming a part of the specification.

Referring to the drawings:

Fig. 2 is a horizontal sectional view taken immediately below the cover, the plane of section being indicated on the line 2—2 of Fig. 1, with the direction of view as indicated.

Fig. 3 is a vertical, transverse sectional view taken upon the line 3—3 of Fig. 2, with the direction of view as indicated.

Fig. 4 is a vertical, transverse sectional view taken upon the line 4—4 of Fig. 2, with the direction of view as indicated.

Fig. 5 is a vertical, longitudinal sectional view taken just behind the front of the cabinet, and showing portions of the mechanism in front elevation. The plane of section is indicated by the line 5—5 of Fig. 2, and the direction of view by the arrows.

Fig. 6 is a vertical, longitudinal sectional view taken just forward of the rear wall, and showing portions of the mechanism in rear elevation. The plane of section is indicated by the line 6—6 of Fig. 2, and the direction of view by the arrows.

Fig. 7 is a vertical, longitudinal, compound sectional view, the planes of section being indicated by the lines 7—7 of Fig. 2, and the direction of view by the arrows.

Fig. 8 is a detail top plan view of the turntable, the pick-up device, and a portion of the mechanism for actuating the latter. This view shows the parts in the positions occupied thereby, upon completion of the playing of a record.

Fig. 9 is a detail view similar to Fig. 8, but showing the parts in the positions occupied thereby, upon commencement of the playing of a record.

Fig. 10 is a detail view in vertical section, showing the pick-up device and the actuating mechanism therefor.

Fig. 11 is a vertical sectional view taken upon the line 11—11 of Fig. 10.

Fig. 12 is a perspective view of the group of actuating cams associated with the pick-up device.

Fig. 13 is a detail view in front elevation, of portions of the pick-up actuating mechanism showing the parts in the positions assumed thereby, upon completion of the playing of a record. The direction of view is indicated by the arrow 13 of Fig. 10.

Fig. 14 is a view similar to Fig. 13, but showing the counterweight moved to the position occupied thereby when the pick-up unit has been raised from the record.

Fig. 15 is a view similar to Fig. 13, but showing the parts after the pick-up arm has been retracted to clear the record.

Fig. 16 is a view similar to Fig. 13, but showing the parts immediately after the pick-up has been deposited upon the next record.

Fig. 17 is a fragmentary, detail view showing the record-elevating and record-inverting mechanism in inoperative position.

Fig. 18 is a detail sectional view showing the inverting mechanism in side elevation. This view also shows the mechanism in inoperative position.

Fig. 19 is a view similar to Fig. 18, but showing the parts in the positions assumed thereby, immediately after engagement of the gripper with the record, and just prior to elevation of the record.

Fig. 20 is a view similar to Fig. 17, but showing the parts as they approach their upper extreme of movement and when the record has been turned through 90°, i. e., one-half of its inversion.

Fig. 21 is a view similar to Fig. 19, but showing the parts as they approach their upper extreme of movement, and after the record has been turned through 90°, i. e., the parts are in the same position as in Fig. 20.

Fig. 22 is a view similar to Fig. 17, but showing the parts in the positions assumed thereby, upon completion of the inversion and re-depositing of the record upon the turntable in inverted position.

Fig. 23 is a detail, vertical sectional view taken upon the line 23—23 of Fig. 2, with the direction of view as indicated, and showing a portion of the drive mechanism in front elevation.

Fig. 24 is a detail, vertical sectional view, the plane of section being taken upon the line 24—24 of Fig. 2, with the direction of view as indicated, and showing another portion of the driving mechanism in rear elevation.

Fig. 25 is a diagrammatic view showing the method of wiring the phonograph, and its association with certain of the mechanical features of the device.

Fig. 26 is a vertical, longitudinal sectional view similar to Fig. 7, but showing a slightly modified form of record separators.

Fig. 27 is a vertical, transverse sectional view taken upon the line 27—27 of Fig. 26.

Fig. 28 is a perspective view of one of the separators of Figs. 26 and 27.

Figure 1:
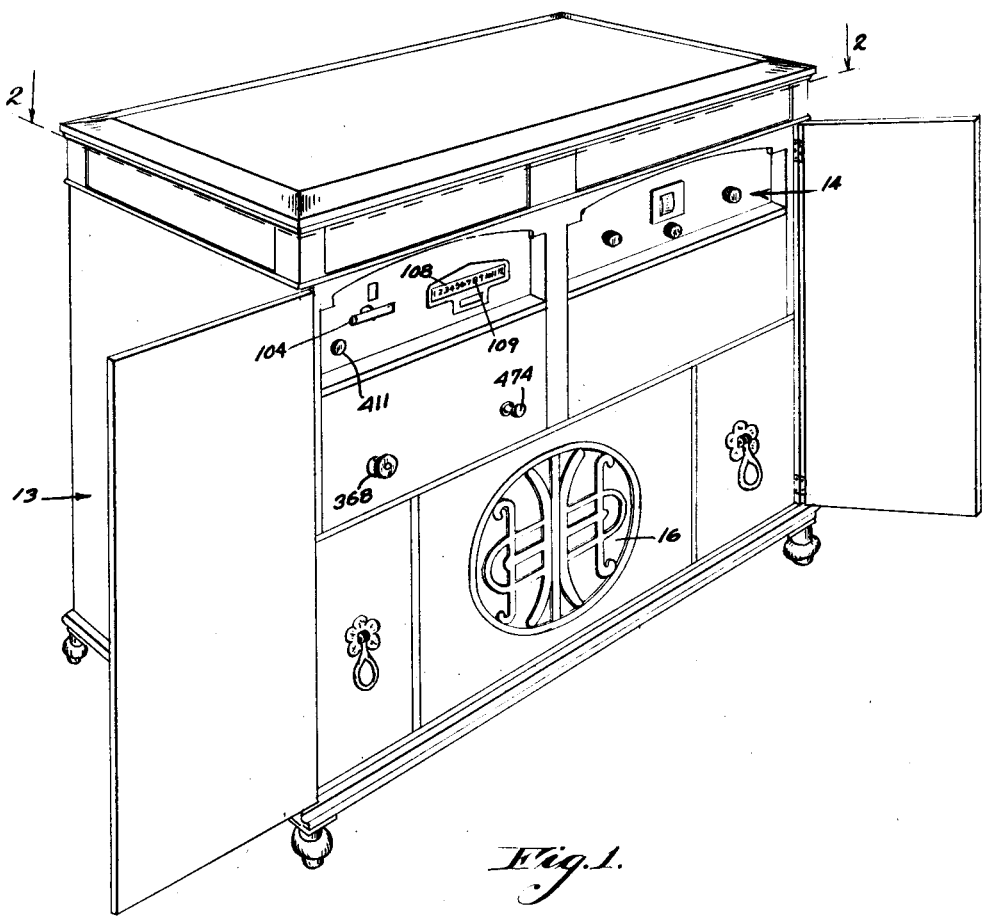
Figure 1 is a perspective view showing the external appearance of a phonograph embodying the principles of the present invention.

In terms of broad inclusion, the phonograph of the present invention, comprises a turntable and rotating means associated therewith, and means for translating into sound, the varying vibration of a needle, which is produced when a record is moved relatively thereto and while in engagement therewith, the record having sound recorded thereon in a series of irregularities in that face of the record with which the needle is in contact. This translating means may be either electrical, under which circumstances the translating means employs a pick-up device whereby the vibrations are translated first into electrical energy and subsequently into sound energy; or it may be of the type employing a sound-box and tone-arm whereby the vibration of the needle is translated directly into sound. For the sake of convenience of terminology, this portion of the translating means will be called a "pick-up" device, this term being used however, in a broad sense, as I do not wish to be limited to the electrical type of translation and amplification.

The phonograph is provided with means for automatically changing records, i. e., removing a record from the turntable after the playing thereof has been completed, and the substitution of another record therefor. Means are also provided for automatically operating the pick-up device in proper synchronization with the record-changing means, whereby the pick-up device is automatically withdrawn from over the played record, to permit removal thereof, and is placed upon the substituted record in playing position. An inverting mechanism is included whereby a record may be lifted from the turntable and replaced thereupon in inverted position after one side thereof has been played, it being understood that the pick-up device goes through a complete cycle of operation each time a record is inverted, as well as each time the record on the turntable is changed. The record-changing mechanism and the record-inverting mechanism, as well as the pick-up device operating mechanism, are all so designed that the phonograph may be satisfactorily operated with records of different diameters, so that records of any size within limits, may be played by means of the phonograph of the present invention. As a result of this arrangement of separate and properly synchronized mechanisms, it is made possible to fill the magazine of my phonograph with practically any desired number of records, and then start the machine in operation, whereupon the machine automatically plays the entire collection of records in the sequence in which they are arranged in the magazine, inverting each record and thus playing both sides thereof before the next record is taken from the magazine. However, the machine is provided with means which may be set in advance, or during operation of the phonograph, for causing the machine to discard each record after the first side thereof has been played, or the machine may be set to repeat the playing of a single record as long as desired. In spite of the fact that the machine is capable of handling the records as above described, with a high degree of efficiency and within an absolute minimum of elapsed time, the parts are so arranged that the records are handled quietly, and with absolutely no danger of harm befalling the records.

Considering the machine in its broad sense in this manner, it will be seen that it includes several distinct but inter-dependent parts, each of which is properly synchronized with the others, to insure satisfactory operation of all. These parts, which will be described separately for the purpose of facilitating the description of the entire machine, are the loading or record-changing mechanism indicated in its entirety at 6, the record-inverting mechanism 7, the pick-up device operating mechanism 8, the driving and synchronizing mechanism 9, and the electrical connections which are illustrated diagrammatically upon Fig. 25, and portions of which also take part in the synchronization of the various operating parts of the phonograph. Various other miscellaneous parts are included, each of which is associated with one or more of the major divisions of the machine, such 'or example, as the record magazine 11, which is most directly associated with the record-changing mechanism or loader 6, and the turntable 12, which is most intimately associated with the record-inverting mechanism 7 and the pick-up device operating mechanism 8.

All the operative parts of the machine are encased within a suitable cabinet 13, one form of which is illustrated upon Fig. 1; and inasmuch as it is entirely within the scope of the invention to mount the phonograph mechanism and a radio-receiving set within the same cabinet 13, this figure also illustrates the manner in which the controls 14 of the radio-receiving set may be arranged and the grid 16 of a loud speaker. Obviously, both the phonograph and the radio-receiving set may deliver electrical energy to the same loud speaker. As will be disclosed as a description of the phonograph proceeds, the various operating portions of the machine are so arranged that even though the mechanism is capable of carrying out the many and the relatively complicated functions, the cabinet 13 is relatively small, the parts being arranged therein in such a manner as to occupy an absolute, theoretical minimum of space.

*Record-changing or loading mechanism*

This portion of the phonograph is best illustrated upon Figs. 2, 3, 5, 6, and 7; and includes a platform 21 which is carried by a shaft 22 extending transversely of the cabinet 13, being journalled within plates 23 and 24, which are carried by front and rear partitions 26 and 27 respectively, which extend parallel to and spaced from the front wall 28 and rear wall 29 respectively, of the cabinet 13. A crank arm 31 is made fast to the forward end of the shaft 22, and a link 32 is pivoted at one end to the outer end of the arm 31, and is journalled at the other end upon a crank pin 33 carried by a disc 34 adapted to be rotated periodically through 180° by the driving mechanism 9, as will be hereinafter described in detail.

The platform 21 has an arcuate recess 36 formed in its outer or free edge, the lateral arms 37 defining this recess, being of such length that they pass beyond the center of the arc described by the recess, the diameter of which is slightly greater than that of the turntable 12. The parts are so proportioned and arranged that when swung to lowermost position, i. e., the position in which it is shown upon Figs. 2 and 7, the turntable 12 is received concentrically within the arcuate recess 36, with the arms 37 partially encircling the turntable 12.

The effective radii of the disc 34 and the arc through which the crank arm 31 moves, are so proportioned that as the disc 34 is rotated, the platform 21 moves from its lower extreme of movement in which the top face of the platform 21 is disposed slightly below the plane of the turntable 12, to its upper extreme of movement in which the platform is disposed at substantially 90° to its starting position. It is not swung to full vertical position however, but to within a few degrees of the vertical, so that when a record is deposited upon the top face of the platform 21, there will be no tendency for the record to fall away therefrom.

Removable means are provided for retaining a record placed upon the top of the platform 21 in this manner, against sliding therefrom. An auxiliary platform 41 is pivotally mounted upon the shaft 22 for rotary movement about the axis thereof, and in respect to the loading platform 21. This auxiliary platform 41 may be in the form of one or more arms lying in a common plane, and joined for simultaneous movement in respect to the main platform 21. Each arm is provided with a plurality of projections 42, the number of projections carried by each arm, corresponding to the number of different diameters of disc records to be placed upon the turntable 12. The projections 42 are so positioned upon the auxiliary platform 41, that each is in register with a similarly shaped aperture 43 in the main platform 21, and each is of such height that when the auxiliary platform 41 is moved to its closest position to the main platform 21, the projections 42 extend slightly above the top surface of the main platform 21. Furthermore, each projection is provided with an arcuate surface 44 defining the outer end of the projection 42 furthest from the shaft 22. These ends 44 are so shaped that they define arcs of circles concentric with the periphery of the turntable 12 when the platforms 21 and 41 are in lowermost position, with the result that a disc record may be retained against sliding downwards upon the inclined top face of the main platform 21 when the periphery thereof is engaged by the arcuate ends 44 of two opposed extended projections 42.

The phonograph of the present modification is designed to accommodate two different diameters of disc records, say for example, 12-inch records indicated at 46, and 10-inch records indicated at 47. Accordingly, the radii of the arcuate ends 44 of the innermost pair of projections 42, measured from the center of the turntable 12, are each five inches; and those of the ends 44 of the outermost projections 42, are six inches. Furthermore, the innermost projections 42 are slightly less in height than the outermost projections 42, with the result that when a 12-inch record 46 is placed upon the top face of the main platform 21, its periphery may be engaged by the outermost projections 42, although the innermost projections 42 are also extended slightly above the surface of the main platform 21.

The degree of angularity of the auxiliary platform 41 with the main platform 21, is determined by an arm 48 pivotally mounted upon each side of the auxiliary platform 41 for rotary movement upon a pin 49 spaced from the shaft 22 upon which the auxiliary platform 41 is mounted. Each of the arms 48, extends downwards from its pin 49 so that its free end 51, which is provided with a foot extending laterally therefrom, engages the bottom 52 of a U-shaped bracket 53 which is secured to the under side of the main platform 21. Each bracket 53 is materially wider than the foot 51 of the associated arm 48, with the result that the arms 48 which are preferably joined by a suitable bar whereby they are caused to move together, may swing from a position wherein they are disposed substantially perpendicularly in respect to the auxiliary platform 41, to a position of obliquity therewith. Inasmuch as the weight of the auxiliary platform 41, is supported by means of the arms 48 resting upon the brackets 53, which, in turn, are carried by the main platform 21, it is obvious that this swinging movement of the arms 48, will vary the angularity of the auxiliary platform 41 with respect to the main platform 21, i. e., when the arms 48 are in perpendicularity with the auxiliary platform 41, this platform 41 will be held closely adjacent the under side of the main platform 21, with the result that the projections 42 extend through the apertures 43 in the main platform 21, their maximum distance. However, when the arms 48 are swung to obliquity in respect to the auxiliary platform 41, this platform is permitted to swing downwards away from the main platform 21 sufficiently to withdraw the projections 42 within their apertures 43, so that they no longer extend above the top surface of the main platform 21.

Inasmuch as the loading platform 21 serves the double function of removing records from the turntable 12 after they have been played, and also of transporting another record from the magazine 11 and placing it upon the turntable 12 in playing position, it is obvious that means must be provided for operating the arms 48 at the proper time to withdraw the projections 42 when it is desired to permit a record to slide off the platform 21 and to again extend the projections 42 just prior to the time that the new record is placed thereupon. Accordingly, each of the plates 23 and 24 which serve as journals for the shaft 22, are also provided with upper and lower cam surfaces 56 and 57 respectively, with which portions of the arms 48 come into contact during movement of the platform 21. The corresponding cam surfaces 56 and 57 of the two plates 23 and 24, are in alignment with each other so that both arms 48 come into engagement therewith simultaneously. The surface 58 joining the cam surfaces 56 and 57 of each plate, is arcuate, and corresponds to a portion of the circular path described by the foot 51 of its associated arm 48. The upper cam surface 56 of each plate, is preferably in the form of a straight line extending angularly inward from a line drawn tangent to the arcuate surface 58 adjacent the upper extreme of movement of the foot 51. Consequently, when the platforms 21 and 41 are swung upwards, the feet 51 will engage the cam surfaces 56 as they approach their upper extreme of movement, forcing the feet 51 of the arms 48, toward the center of the circular path being described thereby, i. e., toward the shaft 22. This movement of the arms 48 will bring them into perpendicularity with the auxiliary platform 41, causing the projections 42 to be extended through their respective apertures 43, so that when a record is subsequently placed upon the inclined top surface of the main platform 21, it will be engaged by either one pair or the other of projections 42 and retained against sliding off the platform. The lower cam surfaces 57 are adapted to be engaged by the opposite edges of the feet 51 as the platforms are swung downwards, and these cam surfaces, which also are preferably straight lines, are disposed in angularity with a tangent drawn to the arcuate path described by the feet 52, at their point of initial contact with the surfaces 57, this angularity however, being in the opposite direction from that of the cam surfaces 56, so that when the feet 51 engage the cam surfaces 57, the arms 48 are forced outwards, increasing the radial distance between the feet 51 and the shaft 22, thus causing the feet 51 to slide across the lower portion 52 of the brackets 53 and permitting the auxiliary platform 41 to drop away from the main platform 21 sufficiently to withdraw the projections 42. This movement occurs just as the platform 21 approaches its lower extreme of movement and after the platform 21 has become close enough to the horizontal to prevent danger of the record sliding across the surface of the platform 21. However, when the platform 21 subsequently is swung forward, the projections 42 will be withdrawn, permitting the record carried upwards thereby from the turntable 12 to slide off the platform 21 when the inclination of the platform 21 has become sufficiently steep. Accordingly, I have provided a record-receiving compartment 61 adapted to receive a removable drawer 62, into which the played records may be discharged as they slide from the inclined platform 21. Preferably the compartment 61 slopes upwards toward the shaft 22, and is provided with an opening 63 extending thereacross adjacent the pivoted end of the platform 21, through which the records may slide into the drawer 62. A spring-pressed catch 64 or its equivalent, releasably retains the drawer 62 in position, so that the drawer 62 may be withdrawn whenever desired to remove any records which have accumulated therein.

A record rack 66, and mechanism 67 for discharging records 46 and 47 therefrom, are provided within the magazine 11. The rack 66 includes a V-shaped frame 68 mounted for rotary movement within the magazine 11 by means of opposed trunnions 69 which are rigid with the outer ends 71 of the legs of the V, and which are mounted within suitable aligned journals 72 which are carried by the partitions 26 and 27. A guide rod 73 extends from each end 71 of the frame 68, perpendicularly with respect to the axis of the trunnions 69, i. e., parallel to the front and back 28 and 29 of the phonograph; and a center guide rod 74 bisects the angle between the legs of the frame 68, and extends therefrom in parallelism with the rods 73. A second V-shaped frame 76 is slidably mounted upon all three rods 73 and 74, this frame 76 however, being provided with a transversely extending bar 77 carrying a circular head 78 adapted to engage the first record 46 or 47 as the case may be, placed upon the rack. The rods 73 are considerably longer than the center rod 74, and extend far enough to engage cleats 79 rigid with the partitions 26 and 27 when the frames 68 and 76 have been swung to horizontal position. Each of these side guide rods 73 also has a plurality of separator tabs 81 loosely retained thereupon. These tabs, which are best shown upon Fig. 3, are materially thicker than any of the records 46 and 47 at their outer ends 82, whereas their inner ends 83 are relieved upon one side to form recesses within which the outer edges of the records 46 and 47 are received. A strip 84 of felt, plush, or similar cushioning material is secured upon each face of each separator 81 adjacent the inner end 83 thereof, so as to prevent scratching the records by their engagement therewith. The separators 81 are so proportioned that their outer ends 82 are considerably heavier than their inner ends 83, with the result that they have the tendency to swing into vertical positions with the outer ends 82 downwards. However, they are retained in horizontal positions, as shown upon Fig. 3, by their engagement with an upper edge 86 with which each of the partitions 26 and 27 is provided. These upper edges 86 terminate approximately in alignment with the outer end of the center guide rod 74, so that when each separator 81 is pushed beyond this point, it will swing into vertical position by passing out of engagement with the associated upper edge 86 of the partition 26 or 27, as the case may be.

The object of employing these separators 81, is to compensate for differentiations in the thickness of the records, so that the discharging mechanism 67 may operate satisfactorily to advance the records a distance equal to the thickness of each of the separators 81, and thus move the records a constant distance for each actuation thereof, even though the records may vary in thickness. The discharging mechanism 67 includes a ratchet 91 which is carried by the slidable frame 76 and disposed in parallelism with the direction of movement therewith. The teeth 92 of the ratchet 91, are spaced a distance equal to the effective thickness of the separators 81, and are adapted to be successively engaged by a pawl 93. This pawl is pivoted to, and extends substantially horizontally from a pair of actuating levers 94 which are joined by a rod 95 which serves as the pivotal mounting for the pawl 93, and which are mounted for pivotal movement upon the adjacent end of the cabinet 13, by means of suitable brackets 96 and a pivot pin 97 extending therebetween. The pawl 93 is pivoted adjacent the upper ends of the levers 94, whereas the lower ends are each adapted to be engaged once during each cycle of operation of the machine, by a cam 98 which is rigid with a drive shaft 99 which forms that portion of the driving mechanism 9 upon which the disc 34 is rigidly secured, it being understood that the shaft 99 makes one complete revolution for each cycle of operation. A leaf spring 101 engages the upper ends of the levers 94, and urges them into retracted position after they have been released by the cams 98, which, it should be explained, are in alignment with each other so as to strike the levers 94 simultaneously. The parts are so proportioned and arranged that when the cams 98 engage the levers 94, the levers 94 are swung about the pivot 97 sufficiently to advance the pawl 93 a distance slightly greater than the distance between the teeth 92 of the ratchet 91. This will cause the slidable rack 76 to be advanced a distance equal to the spacing of the teeth 92; and inasmuch as the records 46 and 47 are slidably mounted upon the central rod 74, the records also will be advanced this distance, carrying the separators 81 in sliding movement upon their respective side guide rods 73.

Inasmuch as the discs 34 whereby the loading platform 21 is reciprocated in pivotal movement, and the cams 98 whereby the discharging mechanism 67 is operated, are both carried by the same shaft 99, it is obvious that the question of synchronization between these two portions of the device, is relatively easily accomplished. The parts are so arranged in respect to each other, that the cams 98 engage their respective levers 94 at the time that the loading platform 21 has been swung to its upper extreme of movement. As pointed out hereinabove, when so positioned, the platform 21 is nearly vertical, but slopes slightly away from the records. Furthermore, at this time, the projections 42 will be extended through the platform 21. Consequently, as the cams 98 cause the levers 94 to swing, with the result that the records are pushed forwards upon the rod 74, the outermost record will drop off the rod 74, onto one pair of projections 42, leaning against the sloping platform 21. It should be pointed out that the projections are so positioned that as the outermost record is pushed off the center of the rod 74, it will drop only a small fraction of an inch before its edge engages the arcuate surfaces 44 of the associated projections 42.

Consequently, it is made possible to discharge the records one by one from the magazine 11, and onto the loading platform 21, and also to retain the records against sliding with respect to the platform 21, with the central hole 102 of each record, at substantially the same distance from the shaft 22 as that separating the central pin 103 of the turntable 12 from the shaft 22. The records will be held in this position regardless of whether it is a 10-inch or 12-inch record discharged from the rack 66, inasmuch as the two pairs of projections are provided, a 10-inch record being engaged by the innermost projections, and a 12-inch record being engaged by the outermost, as explained hereinabove.

This discharge of a record onto the loading platform occurs as rotation of the shaft 99 is continued. However, the loading platform 21 is in receiving position when the pin 33 whereby the link 32 is connected to the disc 34, is disposed upon the opposite side of the disc 34 from the loading platform. Obviously, when in this position, the least motion of the loading platform results from a given amount of motion of the pin 33, with the result that the platform 21 is held substantially stationary at the time the record is being discharged thereupon. However, as rotation of the disc 34 is continued after a record has been discharged upon the platform 21, it will cause the lowering of the platform 21 into the position shown upon Fig. 7. When so disposed, the plane of the platform 21 is slightly below that of the top of the turntable 12, with the result that the platform 21 has deposited the record upon the turntable 12, with the pin 103 of the turntable extending through the central hole 102 of the record, i. e., it has deposited the record upon the turntable in playing position and then moved downwards slightly out of engagement with the record, to permit rotation of the turntable 12 and record, without interference therewith.

During playing of the record, rotation of the disc 34 is stopped, as will be explained hereinbelow; but upon completion of the playing thereof, rotation thereof is again started, which will cause the loading platform to be raised to lift the record from the turntable 12. However, the projections 42 will have been retracted as the platform 21 approaches its lower extreme of movement, with the result that when the loading platform 21 has attained sufficient angularity with the horizontal, the record which it has just removed from the turntable 12, will slide from the platform 21, into the drawer 62. This will occur without the necessity of stopping the upward swinging of the loading platform 21, and consequently, the motion of the platform 21 may be continued until it is again disposed in position to receive the next record from the rack 66.

Loading the records 46 and 47 onto the rack 66 is facilitated because of the possibility of swinging the rack from horizontal position to vertical position. For this purpose, the trunnion 69 adjacent the front 28 of the machine, is extended far enough to accommodate an operating handle 104, see Fig. 1, accessible from the front of the machine, so that by turning the handle 104, the rack 66 may be swung into vertical position. Obviously, this will carry the rods 73 also to vertical position, so that as each record is placed upon the central pin 74, the lowermost separator tabs 81 may be swung through 90° to place their thinner ends upon the top of the record; with the result that when the next record is placed thereupon, it does not make contact with the first record. This is true regardless of whether the records are 10-inch or 12-inch, inasmuch as the padded portion is of sufficient length to accommodate either size of the records. It should be explained that as the records are being successively discharged from the rack 66 onto the loading platform 21, the separating tabs 81 just behind the record being discharged, will swing to vertical position as soon as the pressure of the outermost record thereagainst is relieved; with the result that these tabs are withdrawn before the record therebehind is discharged, and that consequently, they do not interfere with the proper operation of the discharging mechanism 67.

The slidable frame 76 carries an indicator 106 which extends therefrom to a position closely adjacent the front side 28 of the cabinet. A pointer 107 (see Figs. 3 and 5) is formed by bending the forward end of the indicator 106 downwards; and the indicator 106 is of such length that the pointer 107 is positioned closely adjacent the back of the front side 28 of the cabinet 13, where it is visible through an aperture 108 (see Fig. 1). A scale 109 is positioned immediately behind the aperture 108 and the pointer 107, and is provided with a plurality of indicia thereupon, with which the pointer 107 cooperates in such a manner that the number of records remaining in the magazine 11 at any given time, may be ascertained merely by glancing at the scale 109 and noticing the position of the pointer 107 in respect thereto. Upward swinging movement of the frame 76 about the axis of the trunnions 69, is not interfered with by the indicator 106, inasmuch as an arcuate portion 111 is formed upon the forward partition 26, establishing the necessary clearance between the partition 26 and the indicator. Furthermore, the pointer 107 extends downward from above the scale 109, so that as the pointer moves upward, it does not come in contact therewith.

Inverting mechanism

The inverting mechanism 7 is so arranged and so synchronized with respect to the other portions of the machine, that it is capable of lifting a record from the turntable 12 after one side thereof, has been played, turning the record through 180°, and re-depositing the record in inverted position upon the turntable, so that both sides thereof may be played before it is discarded into the record-receiving compartment 61. This record-inverting mechanism is best shown upon Figs. 2, 4, 5, 6, and 17 to 21 inclusive.

A pair of vertical guide rods 126 are arranged adjacent each of two opposite sides of the turntable 12, but extensions 127 and 128 of the partitions 26 and 27 respectively, are interposed between the turntable 12 and the associated pairs of guide rods 126. These extensions 127 and 128 are offset slightly from their respective partitions 26 and 27, so as to permit the opposed pairs of rods 126 to be disposed more closely adjacent the periphery of the turntable 12 than if the extensions were in alignment with the partitions.

An elevator 129 is slidably mounted upon each pair of guide rods 126, and inasmuch as these elevators are identical in construction, it will suffice for the purpose of the present disclosure, to describe but one of them. Each elevator 129 is in the form of a housing 131 having lugs 132 upon opposite sides thereof. The lugs 132 upon each side of the housing 131, are provided with aligned apertures through which one of the guide rods 126 of the associated pair is slidably disposed to permit vertical movement of the elevator 129 upon the guide rods. A pinion 133 is journalled upon a pin 134 (Fig. 4) which is rigid with the housing 131, and which extends perpendicular to a line drawn through the center of the turntable 12 and medially through both elevators 129. A driving rack 136 is slidably mounted within a vertical slot 137 extending from top to bottom of the housing 131, and has an arm 138 extending downwards below the bottom of the rack 136, to be pivotally connected as by a pin 139 to the lower end of an actuating link 141. The rack 136 is meshed with the pinion 133 as is also a horizontally disposed driven rack 142 which is slidably arranged within a horizontal slot 143 extending from front to back of the housing 131 above the pinion 133. In order to permit the pinion 133 to rotate and slide the two racks 136 and 142 without interfering with each other, the vertical or driving rack 136 is bifurcated, and the pinion 133 is of sufficient width to permit its teeth to be enmeshed with both of the branches constituting the bifurcation of the driving rack 136, the driven rack 142 extending horizontally between the two legs of the bifurcated rack 136. A horizontally disposed rod 146 is mounted for free rotary movement about an axis coinciding with the direction of movement of the driven rack 142 when the pinion 133 is turned, this rod 146 being carried by the driven rack 142 so as to be advanced toward the turntable 12 when the driving rack 136 is elevated, it being understood that the driving rack 136 engages that side of the pinion 133 which is remote from the turntable 12. In other words, when the driving rack 136 is elevated, the outermost side of the pinion 133 is also raised; with the result that the top of the pinion 133 moves toward the turntable, carrying with it the driven rack 142 and its revoluble rod 146. Heads 147 and 148 are formed upon the ends of the rod 146, thereby limiting the movement of the rod 146 in respect to the driven rack 142 to rotational movement.

A resilient clip 149 is also secured upon the innermost head 148, this clip being substantially U-shaped in cross section, and of such dimensions that the legs thereof, are adapted to embrace opposite sides of a record with sufficient pressure thereagainst to retain the record against slipping laterally from the clip 149 when the clip and record are turned into vertical position. The liability of the record's slipping from the clip 149, is decreased by forming the inner face of each gripper or clip 149 arcuate, so as to conform more or less, exactly to the configuration of that portion of the periphery of the record which is engaged within the clip 149.

An adjustable stop is provided to limit the downward movement of each of the elevators 129. A bracket 151 is secured to each partition extension 127 and 128 adjacent the lowermost position of each elevator 129. A bolt 152 is threaded upwards through each bracket 151, so as to engage the bottom of the associated housing 131; and a lock nut 153 is provided whereby the bolt 152 may be releasably clamped in adjusted position. By properly setting the bolt 152 associated with each housing 131, it is made possible to so limit the downward movement of each elevator 129 that when in lowermost position the clip 149 or gripper carried thereby, is in horizontal alignment with a record resting upon the turntable 12. Elevating mechanism is associated with each of the front and rear elevators 129. A pair of spaced bearing plates 156 are rigidly mounted above the upper ends of each pair of guide rods 126, and each pair has journalled therebetween, a shaft 157 in vertical alignment with the line of travel of the associated elevator 129. A pinion 158 is made fast to each shaft 157 between the associated plates 156; and a crank arm 159 is made fast adjacent the outer end of each shaft 157. A crank pin 161 pivotally joins the outer end of each crank 159 to the upper end of one of the links 141; with the result that after the shaft 157 is rotated, carrying with it the crank 159, the associated link 141 will be elevated a distance equal to twice the effective length of the crank 159. Inasmuch as each link 141 is joined at its lower end to the driving rack 136, the first portion of the raising movement of the link 141 will result in raising the rack 136, causing the associated pinion 133 to turn without elevating the housing 131, in that direction to cause the driven rack 142 to be advanced toward the turntable 12. This inward movement of the driven rack 142, carrying with it the rod 146 and gripper 149, will continue until the gripper 149 becomes engaged with the periphery of a record in alignment therewith upon the turntable 12. The two cranks 159 are so inter-connected that they rotate simultaneously; with the result that both grippers 149 are advanced at the same time, and consequently, the grippers 149 engage the opposite sides of the record simultaneously. As soon as this engagement takes place, the continued advance of both driven racks 142 ceases, whereupon the continued raising of the links 141, causes both elevators 129 to be raised, carrying with them, i. e., between them, the record which has been engaged by the opposed grippers 149.

The means for inter-connecting the cranks 159, includes an idler gear 166 journalled between each pair of plates 156 and enmeshing the associated pinion 158; and a second pinion 167 also journalled between each pair of plates 156 and corresponding in size to the pinions 158; with the result that the pinions 158 are rotated at the same rate as the pinions 157, but in the opposite direction. Obviously, the axis of the pinions 167 is offset from the common axis of the pinions 157, thus permitting a shaft 168 to extend across the cabinet to inter-connect the two pinions 167 and still be so offset from the line of travel of a record in being elevated and inverted, that it does not interfere with such motion.

At preferably the forward side of the cabinet, the shaft 168 is extended through the forward plate 156 to receive a bevel gear 169 which is rigid with its outer end. This bevel gear 169 is enmeshed by a driving bevel gear 171 which is rigid with the upper end of a drive shaft 172 extending angularly downwards across the cabinet 13, just inside the front wall 28 thereof, to a position closely adjacent the lower left hand corner of the cabinet, where it is operatively coupled to the driving mechanism 9 through the expedient of still another bevel gear 173 (Fig. 5).

It should be understood that the means for driving the shaft 172, are so arranged that it is given one complete revolution during each cycle of the entire machine, and that the pinions 171 and 169 are of the same diameter; with the result that each of the cranks 159 is also given one complete revolution for each cycle of operation. Furthermore, the parts are so synchronized that this revolution of the cranks 159 takes place upon completion of the playing of one side of a record.

Means are provided for inverting the mechanism when the elevators with the record retained therebetween, are adjacent their upper extreme of movement upon the guide rods 141. Relatively little turning effort is required to effect this rotation of a record, and the two aligned rods 146, and therefore it is deemed sufficient to provide turning mechanism adapted to operate upon but one of the rods 146. It should be understood however, that it is altogether within the scope of the present invention, to provide turning mechanism for each elevator.

In the present modification wherein but one turning device is employed, a disc 176 is made fast to the outermost end of the rod 146 associated with the front elevator 129. Four pins 177 are rigidly mounted upon the disc 176 and spaced at equal intervals about its periphery. Furthermore, the pins 177 are so disposed upon the disc 176 that when the associated clip or gripper 149 is arranged horizontally, the pins are arranged in upper and lower horizontal pairs, the corresponding pins 177 of the pairs, being in vertical alignment with each other, as indicated upon Fig. 17. Two pairs, 178 and 179, of pawls 181, are provided, the pairs 178 being further toward the front of the cabinet than the pair 179. The pawls 181 of each pair, are pivotally mounted upon pins 182, the pins 182 of corresponding pawls 181 of the pairs 178 and 179, being in alignment as best shown upon Fig. 4. The pawls 181 of each pair, are so spaced that when the pins 177 carried by the plate 176, are arranged as shown upon Fig. 17, the disc 176 may pass upwards closely adjacent the pawls 181, with the pins 177 extending therebetween without disturbing the pawls 181, it being understood that leaf springs 183 cooperate with the pawls 181, to press those of each pair toward each other until they engage a stop 184 adjacent their upper ends, adapted to retain them in parallelism with each other.

One of the pawls 181 of each pair, say for example, the right hand pawl, is provided with a tooth 186 extending from its inner edge. The bottom 187 of the tooth 186, extends perpendicularly from the inner edge of the associated pawl 181, whereas the top 188 approaches that edge of the pawl at an inclination therewith and gradually merges therewith. The opposite pawl 181 of the same pair, is also provided with a tooth 191, the bottom 192 of which is inclined and merges with the inner edge of the associated pawl 181, but the top 193 of which extends perpendicularly from that edge. The top 193 of the tooth 191 is slightly lower than the bottom 187 of the tooth 186.

In order to facilitate the explanation of the operation of the rotating means, the four pins 177 will be designated as pins A, B, C, and D, respectively, starting with the uppermost pin on the right hand side of the disc and moving around the periphery thereof in a counter-clockwise direction. As the disc 176 rises closely adjacent either of the pairs of pawls 181, and with the pins 177 extending therebetween, the pins B and C will engage the inclined approach 192 of the tooth 191, forcing the associated pawl 181 outwards against the action of the associated space 183. However, upon continued elevation of the disc 176, the pin A will engage the square shoulder 187 forming the bottom of the tooth 186, whereupon still further elevation of the disc 176 will cause the disc 176 to be rotated through 90°. This will position the pin D above the square shoulder 193 of the tooth 191, as shown upon Fig. 20, so that as the disc 176 is lowered, another 90° of rotation will be imparted to the disc 176. This rotation of the disc however, will cause the pin A to move over toward the left, and engage the vertical, inner edge 196 of the tooth 191, which is of material length to permit its being so engaged. This will press the left hand pawl 181 outwards sufficiently to permit the pin D to be released by the square shoulder 193, whereupon the disc 176 will be enabled to move downwards without further rotation. Before the pin A passes out of engagement with the vertical edge 196, the pin D will come into engagement therewith, to hold the square shoulder out of line of travel of the pin C, so that this pin also can pass beyond the square shoulder 193 without causing any continued rotation of the disc. Obviously, the pin B, in passing over the inclined approach 188, to the tooth 186, will simply move the right hand pawl 181 outwards against the action of the associated spring 183. The right hand spring 183 will press the right hand pawl 181 against the pins C and B as the disc passes downwards, and the left hand spring 183 will press its associated pawl 181 against the pins D and A, thus preventing any continued rotation of the disc; with the result that as the disc passes from between the pawls, the pins occupy the positions shown upon Fig. 22.

It is readily understood therefore, that in this manner, the rod 146 carried by the elevator 129 adjacent the front of the cabinet, is caused to rotate through 90° when the associated elevator 129 is adjacent the upper extreme of its movement. Inasmuch as this rod 146 carries a gripper 149 which is in engagement with one side of a record, this record is also carried through 90° of rotation, the gripper 149 and rod 146 in engagement with the other side of the record, simply idling within their associated elevator 129, so that when the record is again deposited upon the turntable 12, it has its second face uppermost.

As shown upon Fig. 4, the outermost pair 178 of pawls 181, is spaced closer to the turntable 12 than the disc 176 when the elevators are in inoperative position. This is to compensate for the inward movement of the driven rack 142 carrying with it the rod 146 and disc 176 until engagement with the edge of the record occurs. Consequently, the pair 178 of pawls 181, are so disposed that they are in the plane in which the pins 177 travel when the grippers 149 are carrying a 12-inch record. The pair 179 of pawls 181, are disposed approximately one inch closer to the turntable 12, so that they are in the plane in which the pins 177 travel when the grippers 149 are carrying a 10-inch record.

Thus it may be seen that when the cranks 159 are rotated, the first effect thereof will be the elevation of the driving racks 136, causing the pinions 133 to be rotated, and consequently, causing the advance of both grippers 149 toward a record upon the turntable 12. As previously explained, this advance will continue until engagement of the grippers 149 with the edge of the record occurs, whether that record be twelve inches or ten inches in diameter. Immediately upon the completion of this engagement, both elevators 129 will simultaneously start upward movement simply because further inward movement of the driven racks 142 is impossible; with the result that any further rotation of the pinions 133 can not take place. If it is a 12-inch record that has been picked up, the inward movement of the racks 142 will cease when the pins 177 are in alignment with the outermost pair 178 of pawls 181, whereas if it is a 10-inch record, this movement will cease when the pins 177 are in registration with the innermost pair 179. Regardless of which of these two sizes of record is being elevated however, the pins 177 will be in registration with either one or the other pair; with the result that when the elevators are adjacent their upper extreme of movement, the record will be inverted as previously explained, causing it to be again deposited upon the turntable 12 with the second side uppermost when the elevators are again moved to their lower extreme of movement.

It should be here observed that when the elevators again strike the stops 152, further lowering of the elevators is prevented. However, when this takes place, the levers 159 will not be directed vertically downwards, nor will they have completed their rotation. Consequently, the remainder of their rotary movement will cause the racks 136 to be slid downwards within the housing 131, rotating the pinions 133 in reverse rotation, and thus pulling the resilient grippers 149 from their engagement with the edge of the record.

*Pick-up operating mechanism*

This portion of the machine is best illustrated upon Figs. 2, and 7 to 16 inclusive.

The function of the pick-up operating mechanism is to elevate the pick-up so as to remove the needle secured thereto, from engagement with the record upon completion of the playing of either side thereof, and to move the entire pick-up device from over the record, to permit unobstructed removal and substitution thereof, or elevation and inversion thereof, as the case may be. The pick-up operating mechanism must then move the pick-up device so as to bring the needle to a position above starting position upon the record which has just been deposited upon the turntable 12, and then lower the needle until engagement between it and the record, occurs, whereupon the actuating mechanism must be disconnected from the pick-up device to permit the pick-up to float across the surface of the record as the playing continues, it being understood that the needle is to be permitted to follow the spiral path defined by the needle groove within the record.

The pick-up device of the present modification, comprises a pick-up unit 211 provided with a thumb screw 212 by means of which a needle 213 may be removably secured thereto in position to extend from the under face of the unit 211. The construction of the unit 211 forms no portion of the present invention, it being understood that any form of translating device may be employed. Suffice it for the purpose of the present disclosure therefore, to explain that the unit 211 is adapted to translate mechanical vibrations of the needle 213, which are caused by its engagement with the record, into electrical vibrations which are conducted by suitable conductors 214 (see Fig. 25) to jacks 216, whence they may be conducted to any suitable type of means for translating the electrical vibrations into sound vibrations.

The pick-up unit 211 is mounted for pivotal movement about a horizontally arranged pin 217 which is carried adjacent the outer end of a pick-up arm 218. This arm 218 is bifurcated at its inner end, the two legs 219 being deflected downwards and rigidly secured to a head 221 which is mounted for rotary movement about a vertical pin 222. This pin 222, see Figs. 10 and 11, which is tubular, is rigid with a bracket 223, which in turn is adjustably supported upon a pin 224 which is rigid with the cabinet 13 adjacent the lower right hand corner thereof, and between the back wall 29 and the extension 128 of the partition 27. This pin 224 is made fast to a pair of aligned brackets 225, by means of locking nuts 226 engaging the top and bottom of each bracket 225, these brackets being carried between spaced bearing plates 227 which extend parallel to the rear wall 229. The material length of the pin 224, both above and below the upper bracket 225, is also threaded for the reception of locking nuts 228 both above and below each of the two legs 229 of the bifurcated inner end of the bracket 223, these legs being provided with suitable aligned apertures through which the pin 224 extends. This method of mounting the bracket 223, permits its adjustment in pivotal motion about the pin 224, and, after proper adjustment has been attained, permits rigidly clamping the bracket 223 in adjusted position by tightening the nuts 228. Not only may the bracket 223 be adjusted in pivotal movement, but in vertical movement also, as will be readily understood.

The head 221 is mounted for rotary movement about the tubular pin 222, carrying with it the pick-up arm 218 as hereinabove mentioned. Inasmuch as the bracket 223 serves also to support the head 221 and pick-up arm 218, an anti-friction thrust bearing 231 is interposed between the outer end 232 of the bracket 223 and the under surface of the head 221; and a counterweight 233 is mounted upon the annular base flange 234 of the head 221, diametrically opposite the pick-up arm 218, so as to balance the weight supported upon the thrust bearing 231. It is readily seen therefore, that the pick-up arm 218 is capable of free rotation about the vertical axis of the pin 222, when disengaged from the actuating mechanism.

Whereas the pin 217, by means of which the pick-up unit 211 is pivotally connected to the pick-up arm 218, is disposed adjacent the inner end of the pick-up unit 211, with the result that the unit 211 tends to swing downwards to bring the needle 213 carried thereby, into engagement with a record, the outer end of the pick-up unit 211, is adapted to be lifted by means of a substantially U-shaped bracket 236 which is looped loosely about the outer end of the pick-up arm 218 and the unit 211, so that a pin 237 extending transversely from the unit 211 adjacent its outer end, rests upon this bracket 236. The legs 238 of the U-shaped bracket 236, extend backward upon both sides of the pick-up arm 218, and are pivoted thereto as by a pin 239. Between the pin 239 and the extreme inner end of the pick-up arm 218, both legs 238 of the bracket 236, are joined by an auxiliary arm 241 which extends to a position in alignment with, and above the tubular pin 222, so as to receive within a slot 242 in its inner end, a pin 243 which is slidably disposed coaxially within the tubular pin 222, and extends upwards therefrom.

A counterweight head 246 is made fast to the pin 243 by means of a lock nut 247, it being understood that the pin 243 is also threaded within an axial hole provided in the top of an extension 248 of the counterweight head 246, the height of the extension 248 being sufficient to dispose the top thereof, above the top of the bifurcations 219 of the pick-up arm 218, whereas the lower face of the counterweight head 246 is disposed closely adjacent the top of the head 221. The slotted inner end 249 of the auxiliary arm 241, is closely confined between the lock nut 247 and the lowermost of two lock nuts 251 which are threaded onto the upper end of the pin 243, the spacing between the lock nuts 247 and 251, being slightly greater than the thickness of the inner end 242 of the auxiliary arm 241; and the width of the slot 242 being slightly greater than the diameter of the pin 243, so as to permit compensation for the variation in the effective length of the auxiliary arm 241 as pivotal movement thereof, occurs about the pivot pin 239. Thus it may be seen that the inner end of the auxiliary arm 241, is so connected to the counterweight 246, that as the counterweight 246 moves up or down, carrying with it the pin 243 which is rigid therewith, the inner end 242 of the auxiliary arm 241, is also similarly moved, thus effecting lowering or raising respectively, the needle 213 of the pick-up unit 211.

Means are provided for effecting vertical movement of the pin 243, whereby to effect raising and lowering of the pick-up unit 211 and the needle 213 carried thereby. A shaft 256 is journalled within both bearing plates 227, so that it extends therebetween in perpendicularity with respect to the rear wall 29. A bevel gear 257 is rigid with this shaft 256, as are a central cam wheel 258, and front and rear cam wheels 259 and 261 respectively; with the result that all three of these cam wheels 258, 259, and 261, are rotated simultaneously through the expedient of the bevel gear 257. For convenience of manufacture and assembly, the front and rear cam wheels 259 and 261 may be rigidly connected together and to the central cam wheel 258, by means of bolts 262 extending through bosses 263 on the central cam wheel 258, as best shown upon Figs. 10 and 12. The front and rear cam wheels 259 and 261 are preferably each formed of a disc portion 266 and an annular flange 267 extending from the periphery thereof, the outer surface of the flanges 267 being relatively smooth, with the exception that the front and rear cam wheels 259 and 261 are provided with slight projections or cams 268 and 269 respectively, adjacent the outermost edges of their respective flange 267, these cams 268 and 269 being angularly offset substantially 60° from each other. The parts are so proportioned and arranged that the cams 268 and 269 are adapted to engage the under surface of the flange 234 of the head 221 as the cam wheels 259 and 261 rotate, and thus effect rotary motion of the head 221 about the axis of the pin 222. However, inasmuch as the front cam wheel 259 is forward of the pin 222, and in further view of the fact that the cam wheels rotate to move their upper sides to the right, as viewed upon Figs. 13 to 16 inclusive, i. e., as viewed from the front of the machine, engagement between the cam 268 and the flange 234, will carry the head 221 in counter-clockwise movement when viewed from above, thus carrying the pick-up arm 218 toward the right hand end of the cabinet, i. e., out from over a record upon the turntable 12. Conversely, when the cam 269, which is carried by the rear cam wheel 261, engages the flange 234, reverse motion of the head 221 and pick-up arm 218 will occur to carry the pick-up arm 218 toward a position over a record upon the turntable 12, it being understood that the rear cam wheel 261 is aft of the tubular pin 222 about which the head 221 is adapted to swing.

The central cam 258 is in the form of a disc which is circular throughout the major portion of its periphery, and of a diameter somewhat less than that of the front and rear cam wheels 259 and 261. The cam wheel 258 is provided with a cam 271 at a point in the periphery thereof, substantially midway between the two cams 268 and 269, i. e., each of the cams 268 and 269 is offset approximately 30° upon opposite sides of the cam 271.

Preferably both the leading and trailing faces of the cam 271 are gently inclined and merge into the circular periphery of the cam wheel 258. The cam 271 is adapted to pass through a slot 272 in the under surface of the inner end 232 of the bracket 223, so as to engage the lower end of the pin 243 as the cam wheels rotate. Obviously, such engagement will cause elevation of the pin 243, carrying with it the inner end of the auxiliary arm 241 to effect lowering of the unit 211 and needle 213. By constructing the cam 271 with a gradually inclined leading edge, this lowering of the unit 211 and needle 213 is relatively gentle; with the result that when the needle 213 is lowered onto a record on the turntable 12, danger of causing damage to the record, is eliminated. When the cam 271 passes out from under the lower end of the pin 243, the counterweight 246 will be permitted to drop so as to effect elevation of the unit 211 and needle 213, as will be readily understood.

When in lowered position, the counterweight 246 is adapted to frictionally engage the upper surface of the head 221; with the result that when so positioned, rotation of the head 221 will also effect rotation of the counterweight 246.

Means are provided for determining the accurate positioning of the unit 211 over starting position upon a record upon the turntable 12, before the pin 243 is raised to effect lowering of the unit 211 and its needle 213. A setting arm 276 is pivotally mounted upon a suitable bracket structure 277 which is carried by the forward bearing plate 227 and extends therefrom far enough to permit a roller 278 which is revolubly mounted upon the outer end of arm 276, to engage the periphery of a record in playing position upon the turntable 12, the point of engagement of the roller 278 with the record, being adjacent the point in the periphery of the record which is proximal to the right hand side 279 of the cabinet 13. It should be pointed out that the turntable 12 is so positioned that the right hand side 279 of the cabinet 13, is relatively close to the edge of a record mounted upon the turntable 12, two or three inches of space intervening therebetween, and that the setting arm 276 may swing to the right far enough so that either a portion of the arm 276 or the roller 278 carried thereby, will come into engagement with the side 279 of the cabinet. Obviously, however, it is quite within the scope of the present invention to employ any suitable stop capable of limiting the outward swinging movement of the setting arm 276.

As the arm 276 swings, it carries with it an arm 281 which is rigidly secured to the forward side of the counterweight 246 as by a pair of screws 282, the connection between the arms 281 and 276 being established by means of a suitable pin 283 rigid with the arm 276 and engaged within a slot 284 in the outer end of the arm 281, permitting sliding movement of the pin 283 within the slot 284, to compensate for the misalignment of the axes about which the arms 281 and 276 swing, see Figs. 8 and 9. From this construction it is seen that as the setting arm 276 swings, it carries with it the arm 281 and consequently, the counterweight 246; and that when swinging movement of the setting arm 276 ceases, rotary motion of the counterweight 246 must also cease.

As explained hereinabove, swinging movement of the counterweight 246 may be effected because of the frictional engagement of the counterweight 246 upon the top of the head 221. Consequently, when the rear cam 269 engages the flange 234 of the head 221 to effect swinging the pick-up arm 218 toward the left end of the cabinet, i. e., toward playing position, the counterweight 246 is carried with the head 221, swinging the setting arm 276 through the expedient of the arm 281. However, as will be readily understood, the inward swinging movement of the counterweight 246 will be stopped when the roller 278 engages the periphery of a record upon the turntable 12, and consequently, disconnectible means are provided for coupling the head 221 to the counterweight 246 in such a manner that when this swinging movement of the counterweight 246 ceases, the swinging movement of the head 221 and pick-up arm 218 will also cease, the parts being so proportioned and arranged that this cessation of swinging movement occurs when the needle 213 is positioned above starting position upon the record. A gravity-actuated catch 291 is pivotally mounted upon the periphery of the counterweight 246 in such position that the point 292 thereof, is adapted to extend downwards below the lower edge of the counterweight 246, into engagement with a ratchet tooth 293 which is rigidly secured to the periphery of the head 221. Those faces of the catches 291 and 293, which come into engagement when the head 221 turns in counter-clockwise direction in respect to the counterweight 246, are inclined; whereas the other faces of both catches 291 and 293, are disposed in perpendicularity with their respective paths of travel, and the catch 291 is provided with a lug 294 bent over to engage the top surface of the counterweight 246 to limit swinging movement of the catch 291 in a clockwise direction as viewed upon Figs. 13 to 16 inclusive. As a result of this arrangement, the head 221 is permitted to freely rotate in that direction which carries the pick-up arm 218 toward the right hand end 279 of the cabinet 13, because when engagement between the tooth 293 and point 292 of the catch 291 occurs during such movement, the catch 291 will merely be lifted to permit the tooth 293 to pass thereunder. However, when the head 221 moves in a clockwise direction, i. e., turns so as to carry the pick-up arm toward the center of the turntable, and the counterweight 246 is held stationary, the tooth 293 will engage the catch 291 in such a manner as to hold the head 221 stationary with respect to the counterweight 246, as will be readily understood. The relative positioning of the catch 291 and tooth 293, is such that when so secured together, the needle 213 of the pick-up unit 211, is in the neighborhood of a quarter or three-eighths of an inch to the left of the roller 278, this distance being approximately the width of the smooth margin with which disc records are conventionally provided, i. e., the distance between the extreme edge of a record and the point at which the needle 213 should be deposited upon the record in playing position.

The mechanism for rotating the bevel gear 257, is adapted to impart one complete revolution thereto immediately after the completion of the playing of either side of a record upon the turntable 12. The cycle of operation of the pick-up setting device starts with the cam 271 in engagement with the lower end of the pin 243, i. e., with the pin 243 elevated and the unit 211 and needle 213 lowered into playing position, it being understood of course, that this is the position which the unit and needle must occupy until completion of the record's playing. Means to be described hereinbelow, for rotating the gear 257, are then automatically set into operation, the first result of which is to rotate all three cam wheels 258, 259, and 261, in a clockwise direction as viewed from the front of the cabinet, i. e., as viewed in Figs. 13 to 16 inclusive. This will cause the cam 271 to be withdrawn from engagement with the pin 243, with the result that the counterweight 246 will be lowered from elevated position (indicated upon Fig. 13) so as to bring it into frictional engagement with the top of the head 221 (as shown upon Fig. 14). This will effect raising the unit 211 to lift the needle 213 out of engagement with the record, as hereinabove described. The cam 268 of the front cam wheel 259 being spaced about 30° behind the cam 271, will come into contact with the under surface of the flange 233 of the head 221, shortly after the cam 271 has left the pin 243, as shown upon Fig. 14. The frictional engagement of the cam 268 with the forward portion of the flange 234, will result in imparting rotational movement to the head 221, in the direction of the arrow R of Fig. 14, so as to carry the pick-up arm away from the center of the record and toward the right hand end 279 of the cabinet 13. The counterweight 246 is at this time in frictional engagement with the head 221, having been lowered thereupon when the pin 243 was released by the cam 271, so that the setting arm 276 is also carried to the right until the roller 278 also engages the end 279 of the cabinet, after which the counterweight 246 will be held stationary with the head 221 sliding thereunder in rotational movement in respect thereto. As this occurs, the tooth 293 carried by the head 221, will pass under the catch 291 which pivots upwards to permit the tooth 293 to pass unrestrictedly therepast, after which the catch 291 again drops into lowered position. The retraction of the pick-up arm 218, continues until it also engages the side 279 of the cabinet 13, at which time the pick-up arm will have been moved slightly beyond the setting arm 276. When this occurs, continued rotation of the head 221 must cease; with the result that the remaining portion of the cam 268 will slide under the head 221 until it passes completely out of engagement therewith.

The rotation of the cam wheels 258, 259, and 261 is continued; but inasmuch as after the cam 268 leaves the head 221, it is necessary for the cam wheels to rotate through substantially 220° before the cam 269 of the rear cam wheel 261, engages the head 221, sufficient time is afforded for the changing of records or for the inversion of a record, as the case may be. The parts are so arranged and synchronized that as soon as the new record has been placed upon the turntable 12, or as soon as the record has been inverted and replaced in playing position, as the case may be, the cam 269 of the rear cam wheel 261, will engage the head 221 in back of its axis of rotary movement. This will cause the pick-up arm 218 to be swung to the left, i. e., toward the record carrying with it the setting arm 241 which is slightly in advance of the pick-up arm 218. This motion of both arms 218 and 276, will continue until the roller 278 engages the edge of the record on the turntable 12. Obviously, this is true, regardless of the size of record employed, which is an important consideration inasmuch as it is the actual engagement of the roller 278 with the edge of the record which determines the position at which the needle 213 will be dropped upon the record; with the result that the mechanism is capable of automatically adjusting itself to operate satisfactorily, regardless of what diameter of record may be the next to be played.

At the time the roller 278 first engages the edge of the record, the catch 291 will be spaced slightly behind the tooth 293, it being remembered that the setting arm 276 was returned toward the record by the frictional engagement of the counterweight 246 to which the setting arm 276 is connected with the head 221 which carries the pick-up arm 218. However, since the roller 278 does come into engagement with the edge of the record, continued motion of the setting arm 276 ceases, whereas the motion of the pick-up arm 218 continues because of the continued engagement of the cam 269 with the under surface of the head 221. This will cause the tooth 293 to overtake the catch 292, as shown upon Fig. 15. As a result, the rotary motion of the pick-up arm 218 continues until such motion is stopped by actual engagement of the square end of the tooth 293 with the pushing face of the catch 291. Obviously, this engagement will bring the pick-up arm also to a stop, because of the fact that further motion of the setting arm 276 toward the center of the record, is prevented by contact of the roller 278 with the edge of the record. As explained hereinabove, the relative positioning of the catch 291 and tooth 293, is such that when the pick-up arm 218 is brought to a stop in this manner, the needle 213 is positioned directly over starting position upon the record. Hence, at this point in the cycle of operation, the pick-up device is in readiness for the lowering of the unit 211 and needle 213 onto the record. This is effected upon completion of one revolution of the shaft 256, because at that time, the cam 271 will again move into position below the pin 243, it being remembered that this cam 271 is offset only about 30° from the cam 269; with the result that the pick-up unit 211 will be lowered very shortly after the pick-up arm 218 has been swung to starting position. As soon as the cam 271 has been moved squarely under the pin 243, the mechanism for rotating the shaft 256, will be stopped, as will be explained hereinbelow, holding the counterweight 246 in elevated position so that the needle 213 is resting upon the record. Furthermore, the catch 291 is of such length that it is adapted to engage the tooth 293 only when the counterweight 246 is in lowered position. This is important because it results in the disengagement of the catch 291 from the tooth 293, as shown upon Fig. 16, as the counterweight 246 is raised to lower the pick-up unit 211. Consequently, at the instant that the needle 213 is lowered onto the record, the pick-up arm 218 is released for free rotary motion, so that the arm 218 is free to move across the face of the record, permitting the needle 213 to follow the groove in the record, without any interference whatsoever, from the mechanism for adjusting the pick-up arm 218. Another detail which should be called to attention, is that especial care has been taken to so gradually incline the leading face of the cam 271, that the needle 213 is lowered very gently onto the record, thus minimizing or completely eliminating the danger of damaging the record when the needle is lowered thereupon.

*Driving mechanism*

This portion of the machine is best shown upon Figs. 2, 3, 5, 6, 23, and 24.

The means for rotating the turntable 12 at the proper speed, are purely conventional; and inasmuch as the construction thereof, forms no portion of the present invention, it will not be shown nor described, other than to explain the way in which the starting and stopping of the turntable 12 is controlled, which will be discussed in connection with the electrical connections.

The record-changing mechanism 6, the record-inverting mechanism 7, and the pick-up operating mechanism 8, all derive the energy necessary for their satisfactory operation, from a common motor 311 mounted preferably adjacent the front 28 of the cabinet, adjacent a pair of spaced bearing plates 312 which are supported between the partition 26 and the front 28, in the lower left hand corner of the cabinet, as best shown upon Fig. 2 and Fig. 6.

The pick-up operating mechanism 9, receives its power from a shaft 314, which is extended at both ends beyond the partitions 26 and 27, so that its forward end 316 is journalled in, and extends through both of the bearing plates 312. The after end 317 extends through, and is journalled within similar spaced bearing plates 318 mounted upon the rear partition 27. Between these plates 318, a gear 319 is made fast to the end 317 of the shaft 314, in such position that it is enmeshed with a smaller gear 321 which is also journalled between the plates 318. A bevel gear 322 in back of the aftermost plate 318, is rigidly connected to the gear 321, and is enmeshed with a similar bevel gear 323 which is carried by a drive shaft 324 extending longitudinally of the phonograph, between the after partition 27 and the back wall 29. The other end of the shaft 324, carries a bevel gear 326 enmeshed with the bevel gear 257 by means of which the cam wheels 258, 259, and 261, are rotated, as previously described. It is readily apparent therefore, that these cam wheels receive the energy necessary for their rotation, from the shaft 314.

Inasmuch as the cabinet 13 will, in most instances, be constructed of wood, which is more or less subject to warping during climatic changes, I have deemed it expedient to provide means for positively establishing the distance between the shaft 256 and the shaft 327 upon which the gears 321 and 322 are mounted. For this purpose, a piece of angle iron 328 is secured to the after bearing plate 227 within which the shaft 256 is journalled, and a similar angle iron 329 is secured to the after bearing plate 318 in which the shaft 327 is journalled, see Fig. 6. Stay bolts 331 extend between the parallel flanges 332 of the angle irons 328 and 329, it being understood that these parallel flanges provide the means for journalling the shaft 324. One such stay bolt 331 is positioned upon each of two opposite sides of the shaft 324. A nut 333 is threaded upon each stay bolt 331, upon each side of each flange 332; with the result that the center to center spacing of the shafts 256 and 327, may be accurately established and maintained by proper adjustment of the nuts 333, so as to insure proper meshing engagement of the gears 322 and 323, and also between the gears 257 and 326. Warping of the material of which the cabinet is constructed, will not affect this accurate spacing of the shaft, because the stay bolts 331 are constructed of metal which is not subject to warping, and the expansion and contraction of which, during temperature changes, is so slight as to be practically negligible.

The record-inverting mechanism 7, is similarly connected by means of the shaft 172 hereinabove described, to a bevel gear 336 with which the bevel gear 173 is enmeshed. This bevel gear 336 is carried by a stub shaft 337 which is journalled between the bearing plates 312, below the shaft 314. In order to accurately maintain the spacing between the shafts 168 and 337, angle irons 338 and 339 are secured to the bearing plates 312, within which the stub shaft 337 is journalled, and the bearing plates 156 within which the forward end of the shaft 168 is journalled, see Fig. 5. Spacers 342 are employed to position the angle iron 339 considerably forward of the bearing plates 156, so as to bring the extreme forward end of the shaft 168 into alignment with the forward end of the stub shaft 337. The shaft 172 is journalled within the parallel flanges 343 of the angle irons 338 and 339; and stay bolts 344 also extend between these flanges 343, to preserve accurate spacing of the shafts 337 and 168. A gear 346 is made fast to the stub shaft 337, so as to effect rotation of the bevel gear 336 and shaft 172, as is necessary to actuate the inverting mechanism 7 whenever the gear 346 is given one complete revolution.

The changing or loading mechanism 6, as previously explained, is operated each time the disc 34 is given a complete revolution. Hence, the forward end 351 of the shaft 99 upon which the disc 34 is rigidly secured, also carries a pair of gears 352 and 353, rigid therewith and disposed between the bearing plates 312, see Fig. 3.

A gear 356 is made fast to the shaft 314 between the after bearing plate 312 and the forward partition 26, this gear 356 being enmeshed by a smaller driving gear 357, which is carried by a shaft 358 upon which a large worm wheel 359 is secured, see Fig. 3. The worm 361 associated with the worm wheel 359, is carried by a shaft 362, which is operatively coupled to the motor 311, to be rotated thereby. Consequently, the gears 356, 357, and 359, and the worm 361, serve as reduction gears, whereby the shaft 314 is rotated at a greatly reduced speed, by means of the motor 311. A pair of spaced driving gears 366 and 367, are splined to the shaft 314, between the plates 312, permitting the gears to be slid longitudinally of the shaft, but insuring their rotation therewith, regardless of their longitudinal position in respect thereto. Sliding movement of the gears 366 and 367, may be effected by means of a knob 368, the shank 369 of which extends slidably and revolubly through the front 28 of the cabinet 13. Three annular grooves 371 are formed in the shank 369, and a spring-pressed catch (not shown) is encased within a housing 372, which is carried by the front 28 of the cabinet 13 encircling the shank 369. This catch is adapted to be releasably engaged within any one of the annular grooves 371, to retain the shank 369 and the gears 366 and 367 in any one of three selected positions. The gears 353 and 346 are in a common plane, and are so positioned that when the catch is disposed within the groove 371 nearest the front end of the shank 369, the gear 367 will be in position to enmesh with both gears 353 and 346. When the knob 368 is pulled to its forward extreme of movement, the catch will seat in the aftermost groove 371, and bring the forward gear 366 into position to engage the gear 352. When the catch is engaged within the intermediate groove 371, the gears 366 and 367 are disposed between the plane of the gear 352 and the plane of the gears 353 and 346, i. e., none of these gears are enmeshed by either of the gears 366 or 367 when the knob 368 is intermediate its two extremes of movement.

The normal position for the knob 368, is that in which the gear 367 is in position to engage both gears 353 and 346. This gear 367 is not toothed throughout its entire periphery. It is somewhat more than twice the diameter of the gears 353 and 346, but is provided with a group 376 of teeth, sufficient in number to effect one complete revolution of each of the gears 353 and 346, each time engagement therebetween takes place, it being understood that the gears 353 and 346 will remain stationary whenever the gear 367 is rotating with the blank space 377 in registration therewith.

The gear 319 secured to the after end of the shaft 314, is provided with two spaced groups 378 and 379 of teeth, each of which is similar to the group 376 of the gear 367, blank spaces 381 being left between the proximal ends of the groups 378 and 379.

As will be explained in connection with the electrical hook-up, the motor 311 will be energized only long enough to effect one-half a revolution of the shaft 314. This will cause alternate, complete revolutions of the gears 346 and 353 through their alternate engagement by the group 376 of teeth on the gear 367, one of the gears 353 or 346 being rotated each time the motor 311 is energized. The gears 367 and 319 are of the same diameter as are the gears 346 and 321; with the result that each time either of the gears 353 or 346 is given a complete revolution, the gear 321 will also be turned through 360°, it being remembered that the gear 319 is provided with two sets 378 and 379 of teeth, one of which comes into engagement with the gear 321 and effects a complete revolution thereof, each time the motor 311 is energized, whereas as explained, the gears 346 and 353 are rotated only upon each alternate operation of the motor 311. Consequently, for one operation of the motor 311, the loading mechanism 6 which is driven by the gear 353, and the pick-up device operating mechanism 9, which is driven by the gear 321, will both be operated, whereas upon the next operation of the motor 311, the loading mechanism 6 will remain stationary while the record-inverting mechanism 7, which is driven by the gear 346, and the pick-up device operating mechanism 9, will be operated. In other words, the pick-up device operating mechanism is actuated whenever either the record-loading mechanism 6, or the record-inverting mechanism 7 is operated; with the result that regardless of whether the record is to be changed or merely to be inverted, the pick-up device will be withdrawn; and as soon as the new record has been placed upon the turntable 12, or the same record has been replaced thereupon in inverted position, the pick-up device will be moved to playing position.

The gear 366 however, is constructed similarly to the gear 319, i. e., it is provided with two sets of teeth, each of which contains the same number of teeth as the set 376 of the gear 367. Consequently, when the knob 368 is pulled forward so as to bring the gear 366 into the plane of the gear 352, the shaft 99 will be given one complete rotation each time the motor 311 is energized. Obviously, this will result in operating the record-changing mechanism and the pick-up device operating mechanism each time the motor 311 is energized, so that when the knob 368 is pulled to its forward extreme of movement, the records will be sent through the machine, playing but one side of each record, the record-inverting mechanism remaining idle. By pushing the knob 368 to its intermediate position, both gears 366 and 367 may be kept out of engagement with their respective gears 352 and the gears 353 and 346; with the result that under such circumstances, both the record-changing mechanism 6 and record-inverting mechanism 7, will remain idle, while the pick-up device mechanism operates each time the motor 311 is energized. This will result in repeating the playing of a single record indefinitely.

It is desirable to employ some suitable type of clutch mechanism capable of bringing the teeth of each pair of gears coming into mesh, into proper position to insure that the first tooth of a group comes into register with a space between teeth of the other gear, so as to insure proper meshing engagement. Without the provision of such clutch means there would be the liability that the first tooth of a group would ride upon the top of a tooth of the driven gear, and thus either strip one or more teeth from the gears, bend one or both of their shafts, or cause other damage to the mechanism. Consequently, each of the gears 319, 366, and 367, and their respective associated gears, are provided with such clutch means. Inasmuch as the several clutch means are identical, it will suffice for the purpose of the present disclosure, to describe but one of them, say for example, that associated with the gear 367, see Figs. 3, 23 and 24. A plate 386 is secured to one side of the gear 367, the outermost edge of this plate 386, being provided with teeth 387 corresponding in cross sectional configuration to the leading teeth 388 of the group 376, so that in effect, the plate 386 serves as a lateral extension of these leading teeth 388, having however, one tooth 387 in advance of the first tooth 388 of the gear 367. Similar plates 391 and 392 are secured to the gears 346 and 353 respectively, these plates 391 and 392 being positioned upon their respective gears in such a manner that they are on that side of their respective gears proximal to the gear 367 during the entire period of disengagement therewith. As a result of this arrangement, as the leading teeth 388 of the group 376, approach either of the gears 346 or 353, say for example the gear 353, the first of the teeth 387 of the plate 386, will come into engagement with the first of the teeth of the plate 392. The first tooth 387 of the plate 386, will properly engage the side of the tooth of the plate 392, because of the fact that there is no tooth in advance of the tooth of the plate 392 with which it comes in contact, so that even though contact is first established with this first tooth of the plate 392 at a point nearer the end of the tooth than desirable, the engagement will be sufficient to effect rotation of the gear 353 so as to bring a groove between two of its teeth, into registration with the first tooth of the group 376, and thus prevent the first tooth of the group 376 from riding upon the top of one of the teeth of the gear 353. The same holds true for the gear 346, with the first tooth of the plate 391 of which the leading tooth 387 of the plate 386 comes into contact as meshing engagement between the group 376 and the gear 346 is established; and similarly, in connection with the gears 319 and 321, as well as the gears 366 and 352.

*Electrical connections*

Energy for the operation of the motor 311 and also the motor indicated at 401 whereby the turntable 12 is powered, is derived from an inlet 402 so positioned in the back 29 of the cabinet 13, that a conductor 403 and plug 404 may be releasably connected thereto, so as to convey electrical energy thereto from any suitable source. One terminal 406 of the inlet 402, is connected by a conductor 407 to one pole 408 of a manually operable switch 409, the button 411 of which is accessible from the front 28 of the cabinet. From the other pole 412, a conductor 413 leads to a triple branch circuit which includes the conductors 416, 417, and 418. The conductor 417 has a switch 419 interposed therein, and leads thence to one pole 421 of a two-way switch 422. The conductors 416 and 418 are shunted around the switch 419, and include the switches 423 and 424 respectively, so that de-energization of the pole 421 of the switch 422, can not occur until all three switches 419, 423, and 424 have been opened. The switch 419 is disposed within the record magazine 11, and comprises a pair of opposed spring contacts 426 and 427, which are adapted to be electrically connected by a conductor strip 428. This strip 428 is mounted for longitudinal sliding movement upon a suitable guide (not shown) inside the record magazine, in position for an extension 429 thereof, to be engaged by a pin 431 rigid with the record rack 76 when the last record is being discharged therefrom. The result of such engagement is to withdraw the strip 428 from between the contact 426 and 427, so as to break the circuit with which the conductor 417 is associated.

From the two-pole switch 422, one conductor 436 leads to one pole 437 of the motor 311, and from the other pole 438 thereof, and another conductor 439 leads back to the opposite pole 441 of the inlet 402, thus completing the circuit whereby the motor 311 is energized. It is obvious therefore, that the circuit of the motor 311 is broken by the removal of the strip 428 from between contacts 426 and 427, at the time the last record is removed from the rack 76. However, it is necessary to maintain energization of the motor 311 until this last record is deposited upon the turntable 12, and to again energize the motor when the record is to be inverted, and again to energize the motor 311 upon completion of the playing of this last record. It is for this purpose that the switches 423 and 424 are employed within the conductors 416 and 418 respectively, these conductors being shunted around the switch 419 as above stated. The shaft 172 carries a trigger 446 rigid therewith, and adapted to open the switch 424 upon completion of the inverting process, it being understood that this switch is closed at all times when not engaged by the trigger 446. The switch 423 is disposed adjacent the shaft 324, whereby the pick-up device operating mechanism is operated; and another trigger 447 is carried by this shaft 324 in position to open the switch 423 at the time when the loading platform 21 has attained an angularity of approximately 60°, i. e., has become sufficiently steep to permit a record to slide therefrom into the record-receiving compartment 61. It will be remembered that the shaft 324 is operated through two complete revolutions for each cycle of operation; with the result that the switch 423 will be opened twice during each cycle, i. e., once while the record is being inverted, and once while the record is being changed. At all times, when there are any records upon the rack 76, current will continue to flow to the pole 421 of the switch 422, through the switch 419; but upon removal of the last record, this switch will be opened as described, whereupon current will flow to the pole 421, through the conductor 416, until the switch 423 is opened by the trigger 447, during the inverting and re-depositing of the record upon the turntable 12. At this time, however, the switch 446 will be closed, so as to maintain energization of the pole 421. Upon completion of the inverting process, the trigger 447 will have moved out of engagement with the switch 423, permitting this switch to again be closed. The trigger 446 on the shaft 172, is so positioned that it opens its switch 424 upon completion of the inverting process, whereupon current will again flow through the conductor 416 and switch 423, to the pole 421 of the switch 422, permitting energization of the motor 311 long enough to remove the pick-up device when the second side of the last record has been played, and to elevate the platform 21 to approximately 60° of angularity with the horizontal, whereupon the switch 423 is opened and the motor 311 stops.

The motor 401 whereby the turntable 12 is rotated, receives its energy by way of a conductor 451 leading from the second output pole of the switch 422 and a second conductor 452 leading from the motor 401 to the conductor 439, so as to conduct current back to the second pole 441 of the inlet 402.

The switch 422 is adapted to direct current optionally to the conductor 436, whereby the motor 311 is energized, or to the conductor 451, whereby the motor 401 is energized; with the result that the turntable motor 401 is rotated only when the motor 311 is still, and conversely, the motor 311 is energized only when the motor 401 is still. This switch is shown in elevation upon Fig. 6. The pole 421 is electrically connected to a spring contact 456, which normally is retained in engagement with the lowermost contact 457, by the inherent resiliency of the material by which the spring contact 456 is constructed. The conductor 436 associated with the turntable motor 401, is electrically connected to a contact 457. However, immediately above the contact 457, a second contact 458 is positioned, and means are provided for pressing the spring contact 456 upwards, out of engagement with the contact 457, and into engagement with the contact 458 with which the conductor 451 is electrically connected.

A pin 461 is mounted for vertical longitudinal movement within a pair of aligned brackets 462, above the shaft 324, so that each time the shaft 324 rotates, a trigger 463 carried thereby, will engage the lower end of the pin 461 and press it upwards. A head 464 of suitable insulating material, is carried by the upper end of the pin 461, and is positioned immediately below the spring contact 456, so that as the pin 461 is pressed upwards, the insulating head 464 will engage the under side of the spring contact 456 and carry it out of engagement with the contact 457 and establish electrical connection with the contact 458. A notch (not shown) is formed in one side of the head 464, into which a plate 467, pivotally mounted as by a pin 468, is adapted to be pressed by a spring (not shown) when the notch comes into alignment therewith.

The head 221 upon which the pick-up arm 218 is mounted, carries a finger 469 which is adapted to engage the plate 467 when the pick-up device has been swung to its inner extreme of movement, i. e., when the needle 213 has attained that position in which the playing of a record is completed. When this engagement between the finger 469 and the plate 467 occurs, the plate will be withdrawn from the notch against the action of the spring, and permit the pin 461 to drop, whereupon the spring contact 456 will leave the contact 458 and establish electrical connection with the contact 457, thus de-energizing the turntable motor 401, and energizing the motor 311.

The trigger 463 is so positioned upon the shaft 324 that it moves the pin 461 upwards just prior to the time that the pick-up arm 218 has been moved to playing position and the needle 213 has been dropped onto the record. The completion of the operation of the pick-up device operating mechanism, will be effected by the momentum of the motor 311, whereas the motor 401 associated with the turntable 12, will start immediately upon the throwing of the switch 422. As a result, the motor 311 is stopped throughout the time that the record is being played, it being understood that at the time, the cam 271 is in engagement with the bottom of the pin 243, holding the counterweight 246 elevated, and resulting in free floating movement of the pick-up arm 218 as the record is being played. However, at the instant that the needle 213 enters the last groove of the record, the trigger 469 will again engage the plate 468, to retract it from the notch (not shown) and permit the switch 421 to be thrown so as to de-energize the turntable motor 401, and energize the motor 311, for the subsequent operation of the record-inverting mechanism 7 or the record-changing mechanism 6, as the case may be, and the pick-up operating mechanism 8.

If it is desired to interrupt the playing of a record and cause it to be removed from the turntable 12, or inverted immediately, this may be accomplished by means of a push rod 471 and a set of bell cranks and actuating rods indicated in their entirety at 472. This actuating mechanism is diagrammatically indicated upon Fig. 25, wherein the rod 471 is shown to extend slidably through brackets 473 in such a manner that its after end is positioned closely adjacent the plate 467, the parts being so proportioned and arranged that when an operating button 474 accessible from the exterior of the cabinet, is depressed, the rod 471 will be slid in such a manner as to actuate the plate 467 in the same way that it is moved when engaged by the finger 469. It is obvious therefore, that at any time during the playing of the first side of a record, the knob 474 may be depressed to interrupt the playing by stopping the turntable motor 401 and starting the motor 311; with the result that the pick-up actuating mechanism 8 will be immediately started to remove the pick-up, and the record-inverting mechanism 7 will be started to effect inversion of the record. It is readily understood that if it is the second side of the record that is being played when the button 474 is depressed, instead of the inverting mechanism 7 being brought into play, the record loading mechanism will be started; with the result that the record will be immediately discharged into the record-receiving compartment 61.

However, if it be desired to interrupt the playing of the first side of a record and cause it to be immediately discharged, i. e., without playing the reverse side, this may be accomplished by actuating both the button 474 and the knob 411, so as to throw the record-inverting mechanism out of gear.

Figs. 26, 27, and 28, show a slightly modified form of record separting means. In this modification each record 476 is to be provided with an individual record case 477 having a circular aperture 478 through the center thereof. A flange 479 extends inwards from the periphery of the aperture 478, to support a record, it being understood that the aperture 478 is slightly greater in diameter than the record to be received thereby, and that the flange 479 will serve to support the record and prevent its slipping through the aperture 478. However, the inside diameter of the flange 479, is slightly greater than that of the turntable 12, so that the case 477 can pass downward beyond the plane of the turntable 12, leaving the record 476 in playing position thereupon.

Notches 481 are formed in the opposed sides of each case 477, permitting a number of cases 477 with their contained records 476, to be slidably mounted upon guides 482 which correspond to the side guide rods 79 of the record rack 66 of the previously described modification.

It is intended that each record 476 be stored within its individual case 477, and that when it is desired to play any record, both that record 476 and its case 477 be positioned in the record magazine 11, with the other records 476 and cases 477 selected for the particular program. Instead, however, of discharging only the outermost record from the rack, it is intended that both the record 476 and its case 477 be discharged onto the loading platform 486, whereupon the platform 486 is adapted to swing downwards to deposit the record 476 upon the turntable, and then pass below the plane thereof, so as to permit unrestricted rotation of the turntable 12 and the record 476 supported thereupon. Furthermore, the overall size of each record case 477, is such that it does not interfere with the normal operation of the record-inverting mechanism 7.

It may thus be seen that all of the record cases 477 may be of the same outside dimensions, even though the various apertures 478 thereof, are of different diameters to accommodate different sized records. As a result of this feature, the problem of stowing the records, is materially facilitated; and also, it is made possible to employ but a single set of projections in connection with the record loading platform 486, whereby sliding movement of the case 477 and its contained record 476 is prevented while the record and case are being moved toward the turntable 12. However, these projections are to be retracted in the manner described previously in connection with the first modification, during elevation of the platform 486, so that both the record 12 and its associated case 477, will slide into the record-receiving compartment 61 when the loading platform 486 has attained sufficient angularity with the horizontal.

Another advantage of this modification, lies in the fact that much more adequate protection is afforded for the various records, inasmuch as each record is handled by means of its individual case 477, and because as the records and cases slide into the compartment 61, the cases 477 will take the entire force of falling, whereas in the first described modification, the deposited record falls onto the uppermost within the compartment 61. Furthermore, relatively tight contact is established throughout the entire periphery of two adjacent cases 477, preventing to a large extent, at least the accumulation of dust upon the playing surfaces of the records.

It is to be understood that the details of the invention as herein disclosed, are subject to alteration within the spirit or scope of the appended claims.

I claim:

1. In an automatic phonograph, a turntable adapted to receive a disc record, a guide perpendicular to the plane of said turntable spaced from a side thereof, an elevator slidably mounted on said guide, a gripper carried by said elevator, means for advancing said gripper into engagement with a record on said turntable, means for raising said elevator a distance as great as the radius of said record, means for rotating said gripper through 180° while the elevator is adjacent the upper extreme of its movement, and means adapting said elevator and gripper to records of different diameters.

2. In an automatic phonograph, a turntable adapted to receive disc records of various diameters, a guide perpendicular to the plane of said turntable spaced from a side thereof, an elevator slidably mounted on said guide, a gripper carried by said elevator and carrying jaws normally disposed in registration with a record on said turntable and spaced from the center thereof a distance as great as the diameter of the largest record within the capacity of the phonograph, means for advancing said gripper radially inwards into engagement with a record on said turntable, means automatically operable upon completion of said engagement for raising said elevator a distance as great as the radius of said record, and means operative with each size of record within the capacity of said phonograph for rotating said gripper through 180° while the elevator is adjacent the upper extreme of its movement.

3. In an automatic phonograph, a record-inverting mechanism comprising an elevator, a gripper including a barrel slidably mounted in said elevator, a rod revolubly mounted in said barrel, a clip carried by one end of said rod, a plate carried by the other end of the rod, and a plurality of pins extending from said plate eccentrically in respect to said rod, means for advancing said barrel to engage said clip upon a record, means automatically operable when the clip has become so engaged for raising and lowering said elevator, and a spring-pressed pawl arranged upon each side of said elevator, one of said pawls being in position to engage one of the pins as the elevator approaches the top of its stroke, and the other pawl being in position to engage a pin as the elevator leaves the top of its stroke.

4. In an automatic phonograph, a turntable adapted to support disc records of various diameters, a pick-up device movably mounted thereadjacent, and friction operated means for depositing said pick-up device in starting position upon a record on the turntable, the motion of said depositing means being limited by contact between said pick-up device and the periphery of the record, whereby the depositing means is automatically adapted to proper functioning with records of any diameter within the capacity of the phonograph.

5. In an automatic phonograph, a turntable adapted to support disc records of various diameters, a head mounted for rotary movement thereadjacent, a vertically movable pick-up unit carried by said head, a counterweight mounted above said head for vertical and coaxial rotary movement in respect to said head, a lever engaging said counterweight and unit and pivoted to said arm therebetween, to support the unit in elevated position when the counterweight is in lowered position, said counterweight frictionally engaging said head when lowered, means for raising said counterweight, means for turning said head to advance the unit to a position over a record on said turntable, and means for stopping the motion of said head when the unit is disposed over starting position on the record, said raising means being adapted to release said counterweight after said motion has been stopped.

6. In an automatic phonograph, a turntable, a motor coupled thereto, a record magazine adapted to hold a plurality of records, a pick-up device disposed adjacent said turntable, means for removing a record from said turntable and substituting therefor a record from said magazine, means for moving said pick-up device to and from playing position upon a record on said turntable, a second motor operatively associated with said pick-up moving means and said record substituting means, a circuit associated with each motor, a two-way switch controlling both circuits and adapted to optionally open either and close the other, means for operating the switch to close the circuit of said second motor when a record has finished playing, and to close the turntable motor circuit upon completion of the operation of said pick-up device moving means in moving the pick-up to playing position, a second switch interposed in both circuits, means for opening said second switch as the last record is taken from the magazine, a by-pass circuit shunted around said second switch to continue operation of said motors after said second switch is opened, and a switch in said by-pass circuit, and means for opening said last mentioned switch upon completion of the playing of said last record.

7. In an automatic phonograph, a revoluble table and rotating means associated therewith, a record magazine and a record-receiving compartment, means for supporting a plurality of disc records in vertical planes within said magazine, a platform mounted for pivotal movement about an axis adjacent an edge of said table and below the discharge end of said supporting means, means for swinging said platform upwards about said axis in position closely adjacent the outermost record upon said supporting means and sloping slightly away therefrom, said swinging means being reversible to lower the platform into position adjacent said table, means for discharging said outermost record onto said platform when in its uppermost position, means operable upon each operation of said platform for retaining a record of any of a plurality of diameters against sliding movement in respect to said platform during lowering thereof, and means for withdrawing said retaining means upon upward movement of the platform thereby permitting a record to slide from said platform when sufficient inclination has been attained, said compartment being in position to receive the record as it slides from the platform.

8. In an automatic phonograph, a horizontally arranged revoluble table and rotating means associated therewith, means for storing a plurality of records of various diameters in vertical planes, said storing means being disposed higher than and to one side of said table, a platform mounted for rotary movement about a horizontal axis substantially below the proximal record to said table, means for reciprocating said platform about said axis between its lowermost position slightly below the plane of said table, and its uppermost position adjacent said outermost record but inclined slightly therefrom, means for discharging a record from said storing means onto said platform when in its upper extreme of movement, said platform partially encircling said table when in lowermost position to support the record during lowering thereof, an arm below said platform and pivoted for movement about said axis, a projection carried by said arm, there being an aperture in said platform in registration with said projection, means operable as the platform approaches its upper extreme of movement for swinging said arm toward the platform and extending said projection through said aperture to engage the periphery of the record discharged thereupon, and means operable as the platform approaches its lower extreme of movement for swinging said arm away from the platform and withdrawing said projection into said aperture.

9. In an automatic phonograph, a turntable adapted to receive disc records of various diameters, a guide perpendicular to the plane of said turntable spaced from a side thereof, an elevator slidably mounted on said guide, a gripper carried by said elevator and carrying jaws normally disposed in registration with a record on said turntable and spaced from the center thereof a distance as great as the diameter of the largest record within the capacity of the phonograph, means for advancing said gripper into engagement with a record on said turntable, means for raising said elevator a distance as great as the radius of said record, and means for rotating said gripper through 180° while the elevator is adjacent the upper extreme of its movement.

10. In an automatic phonograph, a turntable adapted to receive a disc record, a guide perpendicular to the plane of said turntable spaced from a side thereof, an elevator slidably mounted on said guide, a gripper carried by said elevator, said gripper being adapted to accommodate records of various thicknesses, means for advancing said gripper into engagement with a record on said turntable, means for raising said elevator a distance as great as the radius of said record, and means for rotating said gripper through 180° while the elevator is adjacent the upper extreme of its movement.

11. In an automatic phonograph, a turntable adapted to receive disc records of various diameters, a guide perpendicular to the plane of said turntable spaced from a side thereof, an elevator slidably mounted on said guide, a gripper carried by said elevator and carrying jaws normally disposed in registration with a record on said turntable and spaced from the center thereof a distance as great as the diameter of the largest record within the capacity of the phonograph, said gripper being adapted to accommodate records of various thicknesses, means for advancing said gripper into engagement with a record on said turntable, means automatically operable upon completion of said engagement for raising said elevator a distance as great as the radius of said record, for rotating said gripper through 180° while the elevator is adjacent the upper extreme of its movement.

12. In an automatic phonograph, a turntable adapted to receive records of different diameters, a guide arranged perpendicular to the plane of said turntable and spaced from a side thereof, an elevator slidably mounted on said guide, a driving rack slidably mounted on said guide in parallelism with said guide, a driven rack slidably mounted in said elevator and extending therefrom in perpendicularity with the guide and toward said turntable, a resilient clip carried by said driven rack and adapted to engage a record on said turntable by being pressed against the edge of said record, said clip when retracted being spaced from the center of said turntable a distance as great as the radius of the largest record within the capacity of the phonograph, a pinion journalled within said elevator, and means for lifting said driving rack.

13. In an automatic phonograph, a turntable adapted to receive records of different diameters, a guide perpendicular to the plane of said turntable and spaced from a side thereof, an elevator slidably mounted on said guide, a driving rack slidably mounted on said guide in parallelism with said guide, a driven rack slidably mounted in said elevator, a rod mounted for free rotary movement upon said driven rack and extending from the elevator toward said turntable, a resilient clip carried by said rod and adapted to engage a record on said turntable by being pressed against the edge of said record, said clip when retracted being spaced from the center of said turntable a distance as great as the radius of the largest record within the capacity of the phonograph, a pinion journalled within said elevator, means for lifting said driving rack, and means for turning said rod in respect to its associated rack through 180° when the elevator is raised.

14. In an automatic phonograph, a turntable adapted to receive disc records of various diameters, a guide perpendicular to the plane of said turntable spaced from a side thereof, an elevator slidably mounted on said guide, a gripper carried by said elevator and carrying jaws normally disposed in registration with a record on said turntable and spaced from the center thereof a distance as great as the diameter of the largest record within the capacity of the phonograph, said gripper being adapted to accommodate records of various thicknesses, means for advancing said gripper into engagement with a record on said turntable, means automatically operable upon completion of said engagement for raising said elevator a distance as great as the radius of said record, and means operative with each size of record within the capacity of said phonograph for rotating said gripper through 180° while the elevator is adjacent the upper extreme of its movement.

15. In an automatic phonograph, a turntable, a guide perpendicular to the plane of the turntable and spaced from a side thereof, an elevator slidably mounted on said guide, a gripper carried by said elevator for free rotary motion in respect thereto, means for advancing said gripper into engagement with an edge of a record on said turntable, means for raising said elevator a distance as great as the radius of said record, and a plurality of pawls engageable with said gripper to turn the gripper through 180° when the elevator is adjacent the upper extreme of its movement.

16. In an automatic phonograph, a turntable adapted to receive records of different diameters, a guide perpendicular to the plane of the turntable and spaced from a side thereof, an elevator slidably mounted on said guide, a gripper carried by said elevator for free rotary motion in respect thereto, means for advancing said gripper into engagement with an edge of a record on said turntable, means for raising said elevator a distance as great as the radius of said record, a set of pawls for each size of record within the capacity of said phonograph, and means carried by said gripper engageable with the pawls of one of said sets when the elevator is adjacent the top of its stroke to invert the gripper and record.

17. In an automatic phonograph, a record inverting mechanism comprising an elevator, a gripper including a barrel slidably mounted in said elevator, a rod revolubly mounted in said barrel, a clip carried by one end of said rod, a plate carried by the other end of the rod, and a plurality of pins extending from said plate eccentrically in respect to said rod, means for advancing said barrel to engage said clip upon a record, means for raising and lowering said elevator, and a spring-pressed pawl arranged upon each side of said elevator, one of said pawls being in position to engage one of the pins as the elevator approaches the top of its stroke, and the other pawl being in position to engage a pin as the elevator leaves the top of its stroke.

18. In an automatic phonograph, a record inverting mechanism comprising an elevator, a gripper including a barrel slidably mounted in said elevator, a rod revolubly mounted in said barrel, a clip carried by the other end of the rod, and a plurality of pins extending from said plate eccentrically in respect to said rod, means for advancing said barrel to engage said clip upon a record, means for raising and lowering said elevator, and a set of pawls for each size of record within the capacity of said phonograph, each set comprising a spring-pressed pawl upon each side of said elevator and within the line of travel of one of said pins when the clip is engaged upon a record of the associated size, one pawl of each set being in position to engage a pin as the elevator approaches the top of its stroke, and the other pawl of each set being in position to engage a pin as the elevator leaves the top of its stroke.

19. In an automatic phonograph, a record inverting mechanism comprising an elevator, a gripper including a barrel slidably mounted in said elevator, a rod revolubly mounted in said barrel, a clip carried by the other end of the rod, and a plurality of pins extending from said plate eccentrically in respect to said rod, means for advancing said barrel to engage said clip upon a record, means automatically operable when the clip has become so engaged for raising and lowering said elevator, and a set of pawls for each size of record within the capacity of said phonograph, each set comprising a spring-pressed pawl upon each side of said elevator and within the line of travel of one of said pins when the clip is engaged upon a record of the associated size, one pawl of each set being in position to engage a pin as the elevator approaches the top of its stroke, and the other pawl of each set being in position to engage a pin as the elevator leaves the top of its stroke.

20. In an automatic phonograph, a turntable adapted to receive a disc record, a guide perpendicular to the plane of said turntable and spaced from a side thereof, an elevator slidably mounted on said guide, a gripper carried by said elevator, means for advancing said gripper into engagement with a record on said turntable, means for raising said elevator a distance as great as the radius of said record, means for rotating said gripper through 180° while the elevator is adjacent the upper extreme of its movement, and means for limiting the rotary movement of said grippers to 180°.

21. In an automatic phonograph, a turntable, a guide perpendicular to the plane of the turntable and spaced from a side thereof, an elevator slidably mounted on said guide, a gripper carried by said elevator for free rotary motion in respect thereto, means for advancing said gripper into engagement with an edge of a record on said turntable, means for raising said elevator a distance as great as the radius of said record, and a plurality of pawls engageable with said gripper to turn the gripper through 180° when the elevator is adjacent the upper extreme of its movement, said pawls having smooth portions extending parallel to said guide in position to be slidably engaged by a portion of the gripper, whereby the rotary movement of the gripper is limited to 180°.

22. In an automatic phonograph, a record inverting mechanism comprising an elevator, a gripper including a barrel slidably mounted in said elevator, a rod revolubly mounted in said barrel, a clip carried by one end of said rod, a plate carried by the other end of the rod, and a plurality of pins extending from said plate eccentrically in respect to said rod, means for advancing said barrel to engage said clip upon a record, means for raising and lowering said elevator, and a spring-pressed pawl arranged upon each side of said elevator, one of said pawls being in position to engage one of the pins as the elevator approaches the top of its stroke, and the other pawl being in position to engage a pin as the elevator leaves the top of its stroke, one of said pawls having a smooth portion extending parallel to the line of travel of said elevator and in position to slidably engage a plurality of said pins, whereby the rotary movement of said gripper is limited to 180°.

23. In an automatic phonograph, a turntable, guides on opposite sides of said turntable and extending from the plane thereof, elevators slidable on said guides, a gripper carried by each elevator, means for simultaneously advancing said grippers into engagement with opposite edges of a record on said turntable, means for raising and lowering said elevators simultaneously a distance as great as the radius of said record, and means for rotating said grippers through 180° while the elevators are adjacent the top of their stroke.

24. In an automatic phonograph, a turntable, guides on opposite sides of said turntable and extending from the plane thereof, elevators slidable on said guides, a gripper journalled in each elevator, means for simultaneously advancing said grippers into engagement with opposite edges of a record on said turntable, means for raising and lowering said elevators simultaneously a distance as great as the radius of said record, means for rotating said grippers through 180° while the elevators are adjacent the top of their stroke, and means for limiting the rotary movement of said grippers to 180°.

25. In an automatic phonograph, a turntable adapted to receive disc records of various diameters, guides perpendicular to the plane of said turntable and disposed adjacent opposite sides thereof, elevators slidably mounted on said guides, a gripper carried by each elevator and carrying jaws normally disposed in registration with a record on said turntable and spaced from the center thereof a distance as great as the largest record within the capacity of the phonograph, means for advancing said grippers into engagement with a record on said turntable, means for simultaneousy raising and lowering both elevators a distance as great as the radius of said record, and means for rotating said grippers and the record supported thereby through 180° while the elevators are adjacent the upper extreme of their movement.

26. In an automatic phonograph, a turntable adapted to receive disc records of various diameters, guides perpendicular to the plane of said turntable and disposed adjacent opposite sides thereof, elevators slidably mounted on said guides, a gripper carried by each elevator and carrying jaws normally disposed in registration with a record on said turntable and spaced from the center thereof a distance as great as the largest record within the capacity of the phonograph, means for advancing said grippers into engagement with a record on said turntable, means automatically operable upon completion of said engagement for simultaneously raising and lowering both elevators a distance as great as the radius of said record, and means for rotating said grippers and the record supported thereby through 180° while the elevators are adjacent the upper extreme of their movement.

27. In an automatic phonograph, a turntable adapted to receive disc records of various diameters, guides perpendicular to the plane of said turntable and disposed adjacent opposite sides thereof, elevators slidably mounted on said guides, a gripper carried by each elevator and carrying jaws normally disposed in registration with a record on said turntable and spaced from the center thereof a distance as great as the largest record within the capacity of the phonograph, means for advancing said grippers into engagement with a record on said turntable, means actuated by said engagement for simultaneously raising and lowering both elevators a distance as great as the radius of said record, and means for rotating said grippers and the record supported thereby through 180° while the elevators are adjacent the upper extreme of their movement.

28. In an automatic phonograph, a turntable adapted to receive disc records of various diameters, guides perpendicular to the plane of said turntable and disposed adjacent opposite sides thereof, elevators slidably mounted on said guides, a gripper journalled in each elevator and carrying jaws normally disposed in registration with a record on said turntable and spaced from the center thereof a distance as great as the largest record within the capacity of the phonograph, means for advancing said grippers into engagement with a record on said turntable, means for simultaneously raising and lowering both elevators a distance as great as the radius of said record, and means associated with one of said grippers for rotating both grippers and the record supported thereby through 180° while the elevators are adjacent the upper extreme of their movement.

29. In an automatic phonograph, a turntable adapted to receive disc records of various diameters, guides perpendicular to the plane of said turntable and disposed adjacent opposite sides thereof, elevators slidably mounted on said guides, a gripper journalled in each elevator and carrying jaws normally disposed in registration with a record on said turntable and spaced from the center thereof a distance as great as the largest record within the capacity of the phonograph, means for advancing said grippers into engagement with a record on said turntable, means actuated by said engagement for simultaneously raising and lowering both elevators a distance as great as the radius of said record, and means associated with one of said grippers for rotating both grippers and the record supported thereby through 180° while the elevators are adjacent the upper extreme of their movement.

30. In an automatic phonograph, a turntable adapted to support disc records of various diameters, a pick-up device movably mounted thereadjacent, means for altering the elevation of said pick-up device, friction operated means for swinging the pick-up device to and from position above a record on said turntable while said device is elevated, means actuated by making contact with the periphery of said record for stopping the swinging of said device when disposed over starting position on said record, and means for lowering said device into playing position upon said record.

31. In an automatic phonograph, a turntable adapted to support disc records of various diameters, a pick-up device movably mounted thereadjacent, means for altering the elevation of said pick-up device, friction operated means for swinging the pick-up device to and from position above a record on said turntable while said device is elevated, means actuated by making contact with the periphery of said record for stopping the swinging of said device when disposed over starting position on said record, and means for lowering said device into playing position upon said record, said swinging means becoming disengaged from the pick-up device substantially at the time of lowering, whereby the pick-up device is capable of free floating movement while supported upon the record.

32. In an automatic phonograph, a turntable adapted to support disc records of various diameters, a head mounted for rotary movement thereadjacent, a vertically movable pick-up unit carried by said head, a counterweight mounted above said head for vertical and coaxial rotary movement in respect to said head, a lever engaging said counterweight and unit and pivoted to said arm therebetween to support the unit in elevated position when the counterweight is in lowered position, said counterweight frictionally engaging said head when lowered, means for raising said counterweight, yielding means for turning said head to advance the unit to a position over a record on said turntable, a pivotally mounted arm coupled to said counterweight to be swung thereby, said arm being adapted to engage the periphery of said record in swinging toward the center thereof, means locking the head to the counterweight to stop the motion of said head when the arm engages the record, said raising means being adapted to release said counterweight after said motion has been stopped.

33. In an automatic phonograph, a turntable adapted to support disc records of various diameters, a head mounted for rotary movement thereadjacent, a vertically movable pick-up unit carried by said head, a counterweight mounted above said head for vertical and coaxial rotary movement in respect to said head, a lever engaging said counterweight and unit and pivoted to said arm therebetween to support the unit in elevated position when the counterweight is in lowered position, said counterweight frictionally engaging said head when lowered, means for raising said counterweight, friction means for turning said head to advance the unit to a position over a record on said turntable, a pivotally mounted arm coupled to said counterweight to be swung thereby, said arm being adapted to engage the periphery of said record in swinging toward the center thereof, means locking the head to the counterweight to stop the motion of said head when the arm engages the record, said raising means being adapted to release said counterweight after said motion has been stopped.

34. In an automatic phonograph, a turntable, adapted to support disc records of various diameters, a head mounted for rotary movement thereadjacent, a vertically movable pick-up unit carried by said head, a counterweight mounted above said head for vertical and coaxial rotary movement in respect to said head, a lever engaging said counterweight and unit and pivoted to said arm therebetween to support the unit in elevated position when the counterweight is in lowered position, said counterweight frictionally engaging said head when lowered, means for raising said counterweight, friction means for turning said head to advance the unit to a position over a record on said turntable, a pivotally mounted arm coupled to said counterweight to be swung thereby, said arm being adapted to engage the periphery of said record in swinging toward the center thereof, means locking the head to the counterweight to stop the motion of said head when the arm engages the record, said locking means being adapted to stop said motion when the unit is disposed over starting position on the record, said raising means being adapted to release said counterweight after said motion has been stopped.

35. In an automatic phonograph, a turntable adapted to support disc records of various diameters, a head mounted for rotary movement thereadjacent, a vertically movable pick-up unit carried by said head, a counterweight mounted above said head for vertical and coaxial rotary movement in respect to said head, a lever engaging said counterweight and unit and pivoted to said arm therebetween to support the unit in elevated position when the counterweight is in lowered position, said counterweight frictionally engaging said head when lowered, means for raising said counterweight, friction means for turning said head to advance the unit to a position over a record on said turntable, a pivotally mounted arm coupled to said counterweight to be swung thereby, said arm being adapted to engage the periphery of said record in swinging toward the center thereof, means locking the head to the counterweight to stop the motion of said head when the arm engages the record, said locking means being adapted to stop said motion when the unit is disposed over starting position on the record, and said locking means being automatically releasable when the counterweight is raised, said raising means being adapted to release said counterweight after said motion has been stopped.

36. In an automatic phonograph, a turntable adapted to support disc records of various diameters, a head mounted for rotary movement thereadjacent, a vertically movable pick-up unit carried by said head, a counterweight mounted above said head for vertical and coaxial rotary movement in respect to said head, a lever engaging said counterweight and unit and pivoted to said arm therebetween to support the unit in elevated position when the counterweight is in lowered position, said counterweight frictionally engaging said head when lowered, a pair of cams revolubly mounted below said head in position to engage the under side thereof upon opposite sides of its axis of rotary movement, a third cam operatively associated with said counterweight to lift it and lower the unit, and means for rotating said cams.

37. In an automatic phonograph, a turntable adapted to support disc records of various diameters, a head mounted for rotary movement thereadjacent, a vertically movable pick-up unit carried by said head, a counterweight mounted above said head for vertical and coaxial rotary movement in respect to said head, a lever engaging said counterweight and unit and pivoted to said arm therebetween, to support the unit in elevated position when the counterweight is in lowered position, said counterweight frictionally engaging said head when lowered, a unit advancing cam and a unit withdrawing cam revolubly mounted below said head in position to engage the under side thereof upon opposite sides of its axis of rotary movement, a third cam operatively associated with said counterweight to lift it and lower the unit, means for rotating said cams, and means for holding said head stationary against the action of said advancing cam when the unit is disposed over starting position on a record on said turntable.

38. In an automatic phonograph, a turntable adapted to support disc records of various diameters, a head mounted for rotary movement thereadjacent, a vertically movable pick-up unit carried by said head, a counterweight mounted above said head for vertical and coaxial rotary movement in respect to said head, a lever engaging said counterweight and unit and pivoted to said arm therebetween to support the unit in elevated position when the counterweight is in lowered position, said counterweight frictionally engaging said head when lowered, a unit advancing cam and a unit withdrawing cam revolubly mounted below said head in position to engage the under side thereof upon opposite sides of its axis of rotary movement, a third cam operatively associated with said counterweight to lift it and lower the unit, means for rotating said cams, and means for holding said counterweight against rotary movement when said unit has been swung by the advancing cam to a position over starting position on a record on said turntable, and means for locking the head to the counterweight to be held thereby against continued rotary motion, said lifting cam being positioned in respect to the other cams to lift the counterweight while said advancing cam is in engagement with the head.

39. In an automatic phonograph, a turntable adapted to support disc records of various diameters, a head mounted for rotary movement thereadjacent, a vertically movable pick-up unit carried by said head, a counterweight mounted above said head for vertical and coaxial rotary movement in respect to said head, a lever engaging said counterweight and unit and pivoted to said arm therebetween to support the unit in elevated position when the counterweight is in lowered position, said counterweight frictionally engaging said head when lowered, a unit advancing cam and a unit withdrawing cam revolubly mounted below said head in position to engage the under side thereof upon opposite sides of its axis of rotary movement, a third cam operatively associated with said counterweight to lift it and lower the unit, means for rotating said cams, and means for holding said counterweight against rotary movement when said unit has been swung by the advancing cam to a position over starting position on a record on said turntable, and means operative while said counterweight is lowered and inoperative while the counterweight is elevated for locking the head to the counterweight to be held thereby against continued rotary motion, said lifting cam being positioned in respect to the other cams to lift the counterweight while said advancing cam is in engagement with the head, and means for stopping said cam rotating means while the counterweight is raised by its cam.

40. In an automatic phonograph, a turntable adapted to support disc records of various diameters, a head mounted for rotary movement thereadjacent, a vertically movable pick-up unit carried by said head, a counterweight mounted above said head for vertical and coaxial rotary movement in respect to said head, a lever engaging said counterweight and unit and pivoted to said arm therebetween to support the unit in elevated position when the counterweight is in lowered position, said counterweight frictionally engaging said head when lowered, a unit advancing cam and a unit withdrawing cam revolubly mounted below said head in position to engage the under side thereof upon opposite sides of its axis of rotary movement, a third cam operatively associated with said counterweight to lift it and lower the unit, means for rotating said cams, and means for holding said counterweight against rotary movement when said unit has been swung by the advancing cam to a position over starting position on a record on said turntable, and means operative while said counterweight is lowered and inoperative while the counterweight is elevated for locking one head to the counterweight to be held thereby against continued rotary motion, said lifting cam being positioned in respect to the other cams to lift the counterweight while said advancing cam is in engagement with the head, means for stopping said cam rotating means while the counterweight is raised by its cam, and means for starting said cam rotating means when said unit has been carried to a predetermined distance from the center of the record, said withdrawing cam being in position to engage the head substantially as the lifting cam becomes inoperative.

41. In an automatic phonograph, a record magazine, a rack pivotally mounted therein and adapted to receive a plurality of disc records in horizontal position, means for removing said records successively from said rack when the records are in vertical position, means for supporting said rack after having been swung into position to dispose said records vertically, spacing means interposed between said records to prevent contact therebetween, and means for periodically advancing records on said rack after the rack has been swung into position to dispose the records vertically.

42. In an automatic phonograph, a motor, a drive shaft coupled thereto, a drive gear carried thereby and having teeth throughout a portion of its periphery and a blank space throughout the remainder thereof, record-changing means, and record-inverting means, each of said means including a toothed driven gear disposed at different positions about the periphery of said drive gear whereby they are rotated thereby at different times.

43. In an automatic phonograph, a motor, a drive shaft coupled thereto, a drive gear carried thereby and having teeth throughout a portion of its periphery and a blank space throughout the remainder thereof, record-changing means and record-inverting means, each of said means including a toothed driven gear disposed at different positions about the periphery of said drive gear whereby they are rotated thereby at different times, and means for insuring proper meshing of the teeth of the drive gear with the teeth of the driven gears, each time engagement therebetween occurs.

44. In an automatic phonograph, a motor, a drive shaft coupled thereto, a drive gear carried thereby and having teeth throughout a portion of its periphery and a blank space throughout the remainder thereof, record-changing means and record-inverting means, each of said means including a toothed driven gear disposed at different positions about the periphery of said drive gear whereby they are rotated thereby at different times, each of said driven gears having a portion extending laterally beyond one side of said drive gear, and an extension tooth extending laterally from said side of the drive gear and in alignment with the leading tooth thereof to insure proper alignment of the drive gear and driven gear before engagement of their respective teeth.

45. In an automatic phonograph, a revoluble table and rotating means therefor, a record magazine, a plurality of record cases receivable within said magazine, each of said cases having an aperture therethrough slightly larger than said table and a depression arranged concentrically with said aperture, the depression of each of said cases being adapted to receive a record, means for transporting a case and its record from said magazine to said table and depositing said record upon the table but carrying said case therepast, and means for supporting said case slightly below said table while said table and record rotate.

46. In an automatic phonograph, a revoluble table and rotating means therefor, a record magazine, a plurality of record cases receivable within said magazine, each of said cases having an aperture therethrough slightly larger than said table and a depression arranged concentrically with said aperture, the depression of each of said cases being adapted to receive a record, means for transporting a case and its record from said magazine to said table and depositing said record upon the table but carrying said case therepast, means for supporting said case slightly below said table while said table and record rotate, means for supporting said cases and their contained records within said magazine, and means operative each time a case is withdrawn from said magazine for advancing the remaining cases a distance equal to the thickness of the withdrawn case.

47. In a sound reproducing machine, a turntable having a central pin projecting therefrom, a record magazine adapted to hold a plurality of disc records of different diameters and arranged in any order desired, each record having a central aperture, means including a platform mounted for pivotal movement on a fixed horizontal axis for transporting one of said records at a time from said magazine to said turntable and depositing it thereupon with said pin extending through the central aperture of the record, and means operative upon each operation of said transporting means and cooperative with records of any of said diameters by engaging the edges of the records to dispose the record being carried by the transporting means with the central aperture thereof in position to receive said pin as the record is moved onto the turntable.

GEORGE G. POLAKOFF.